US009340859B2

(12) United States Patent
Miyata et al.

(10) Patent No.: US 9,340,859 B2
(45) Date of Patent: May 17, 2016

(54) METHOD FOR MANUFACTURING HIGH STRENGTH GALVANIZED STEEL SHEET HAVING EXCELLENT STABILITY OF MECHANICAL PROPERTIES, FORMABILITY, AND COATING APPEARANCE (75) Inventors: Mai Miyata, Tokyo (JP); Yoshitsugu Suzuki, Tokyo (JP); Yoshiyasu Kawasaki, Tokyo (JP); Tatsuya Nakagaito, Tokyo (JP); Shinjiro Kaneko, Tokyo (JP); Yasunobu Nagataki, Tokyo (JP)

(73) Assignee: JFE Steel Corporation (JP)

( * ) Notice: Subject to any disclaimer, the term of this patent is extended or adjusted under 35 U.S.C. 154(b) by 361 days.

(21) Appl. No.: 14/119,656

(22) PCT Filed: Jun. 1, 2012

(86) PCT No.: PCT/JP2012/064730
§ 371 (c)(1),
(2), (4) Date: Feb. 24, 2014

(87) PCT Pub. No.: WO2012/165661
PCT Pub. Date: Dec. 6, 2012

(65) Prior Publication Data
US 2014/0174608 A1     Jun. 26, 2014

(30) Foreign Application Priority Data
Jun. 1, 2011   (JP) ................. 2011-123786

(51) Int. Cl.
*C21D 1/76*     (2006.01)
*C22C 38/02*    (2006.01)
(Continued)

(52) U.S. Cl.
CPC ................. *C23C 2/02* (2013.01); *B32B 15/013* (2013.01); *C21D 1/74* (2013.01); *C21D 1/76* (2013.01);
(Continued)

(58) Field of Classification Search
CPC ...... C21D 1/74; C21D 1/76; C21D 2211/005; C23C 2/02; C23C 2/06; C23C 2/40; C22C 38/001; C22C 38/02; C22C 38/04; C22C 38/06; C22C 38/24; C22C 38/34; C22C 38/38; C22C 38/58; B32B 15/013
See application file for complete search history.

(56) References Cited

U.S. PATENT DOCUMENTS 8,911,574 B2 * 12/2014 Ootsuka ................ C21D 1/76
                                                  148/112

FOREIGN PATENT DOCUMENTS

EP   2 840 161     2/2015
JP   04-026744     1/1992
(Continued)

OTHER PUBLICATIONS

Supplementary European Search Report dated May 4, 2015 of corresponding European Application No. 12792750.7.

*Primary Examiner* — Lois Zheng
(74) *Attorney, Agent, or Firm* — DLA Piper LLP (US)

(57) ABSTRACT

A method of manufacturing a high strength galvanized steel sheet has a first heating step including heating to 400° C. to 750° C. in an atmosphere containing $O_2$: 0.1 to 20 percent and $H_2O$: 1 to 50 percent and heating to 600° C. to 850° C. in an atmosphere containing $O_2$: 0.01 to less than 0.1 percent and $H_2O$: 1 to 20 percent is applied to a steel sheet, a second heating step includes holding the steel sheet in an atmosphere containing $H_2$: 1 to 50 percent and having a dew point of 0° C. or lower at 750° C. to 900° C. for 15 to 600 s, cooling to a temperature of 450° C. to 550° C., and holding is performed at that temperature for 10 to 200 s, and a galvanization treatment is applied.

12 Claims, 2 Drawing Sheets (51) Int. Cl.

| | | |
|---|---|---|
| *C23C 2/06* | (2006.01) | |
| *C23C 2/02* | (2006.01) | |
| *C21D 9/46* | (2006.01) | |
| *C22C 38/06* | (2006.01) | |
| *C22C 38/58* | (2006.01) | |
| *C23C 2/40* | (2006.01) | |
| *C21D 1/74* | (2006.01) | |
| *B32B 15/01* | (2006.01) | |
| *C22C 38/00* | (2006.01) | |
| *C22C 38/04* | (2006.01) | |
| *C22C 38/24* | (2006.01) | |
| *C22C 38/34* | (2006.01) | |
| *C22C 38/38* | (2006.01) | |
| *C23C 2/28* | (2006.01) | |

(52) U.S. Cl.
CPC ................ *C21D 9/46* (2013.01); *C22C 38/001* (2013.01); *C22C 38/02* (2013.01); *C22C 38/04* (2013.01); *C22C 38/06* (2013.01); *C22C 38/24* (2013.01); *C22C 38/34* (2013.01); *C22C 38/38* (2013.01); *C22C 38/58* (2013.01); *C23C 2/06* (2013.01); *C23C 2/285* (2013.01); *C23C 2/40* (2013.01); *C21D 2211/005* (2013.01)

(56) References Cited

FOREIGN PATENT DOCUMENTS

| JP | 4-202630 | 7/1992 |
|---|---|---|
| JP | 2000-212684 A | 8/2000 |
| JP | 2001-140022 A | 5/2001 |
| JP | 2007-182625 A | 7/2007 |
| JP | 2007-291498 A | 11/2007 |
| JP | 2010-196083 | 9/2010 |
| WO | 2009/081997 A1 | 7/2009 |
| WO | 2009/099251 A1 | 8/2009 |
| WO | 2010/098416 A1 | 9/2010 |
| WO | 2011/090179 | 7/2011 |
| WO | 2011/090180 A1 | 7/2011 |

\* cited by examiner

METHOD FOR MANUFACTURING HIGH STRENGTH GALVANIZED STEEL SHEET HAVING EXCELLENT STABILITY OF MECHANICAL PROPERTIES, FORMABILITY, AND COATING APPEARANCE

TECHNICAL FIELD

This disclosure relates to a method of manufacturing a high strength galvanized steel sheet suitable for a member used in the industrial fields of automobiles, electric appliances and the like and which has excellent stability of mechanical properties, formability, and, in addition, coating appearance.

BACKGROUND

In recent years, enhancement of fuel economy of the automobile has become an important issue from the viewpoint of global environmental conservation. Consequently, there is an active movement afoot to reduce the thickness through increases in strength of car body materials to reduce the weight of a car body itself.

However, an increase in strength of a steel sheet causes reduction in ductility, that is, reduction in formability. Therefore, development of materials having high strength and high formability in combination has been desired.

Furthermore, in forming of the high strength steel sheet into a complicated shape, e.g., an automobile component, occurrences of cracking and necking in a punch stretch portion or a stretch flange portion cause serious issues. Therefore, a high strength steel sheet which can overcome the issues on occurrences of cracking and necking and which has high ductility and high hole expansion property in combination has also been required.

Moreover, shape fixability is degraded by an increase in strength and thickness reduction of a steel sheet significantly. To cope with this, in press forming, it has been widely performed that changes in shape after release from a mold is predicted and the mold is designed in expectation of the amount of change in shape. However, if the tensile strength (TS) of a steel sheet is changed, deviation from the expected amount, in which the tensile strength is assumed to be constant, becomes large and odd shapes occur. Consequently, reworking, e.g., sheet-metal working of the shape on a one-by-one basis, becomes necessary after press-forming, and efficiency in mass production is degraded significantly. Therefore, it is required that variations in TS of the steel sheet are minimized.

As for an improvement of formability of the high strength steel sheet, heretofore, various multi phase high strength galvanized steel sheets, e.g., a ferrite-martensite dual-phase steel and a TRIP steel taking advantage of the transformation induced plasticity of retained austenite, have been developed.

For example, Japanese Unexamined Patent Application Publication No. 2001-140022 discloses a method of manufacturing a galvanized steel sheet having excellent ductility by specifying the chemical composition to be within a specific range and, in addition, specifying the volume ratios of retained austenite and martensite and the manufacturing conditions. Meanwhile, Japanese Unexamined Patent Application Publication No. 04-026744 discloses a galvanized steel sheet having excellent ductility by specifying the chemical composition to be within a specific range and, in addition, specifying the specific manufacturing condition. Japanese Unexamined Patent Application Publication No. 2007-182625 discloses a galvannealed steel sheet having excellent ductility by specifying the chemical composition to be within a specific range and, in addition, specifying the volume ratios of ferrite, bainitic ferrite, and retained austenite within specific ranges. Meanwhile, Japanese Unexamined Patent Application Publication No. 2000-212684 discloses a method of manufacturing a high strength cold rolled steel sheet which contains ferrite, bainite, and 3% or more of retained austenite and in which variations in elongation in the sheet width direction have been reduced.

However, in JP '022, JP '744 and JP '625, an improvement in ductility of the high strength thin steel sheet is the main purpose. Therefore, the hole expansion property is not taken into consideration. Also, in JP '684, only variations in the total elongation EL in the sheet width direction are described, and variations in mechanical properties due to the component composition and the production condition are not taken into consideration. As described above, in every technology, a high strength galvanized steel sheet having high ductility and high hole expansion property in combination and, in addition, having excellent stability of mechanical properties has not been obtained.

It could therefore be helpful to provide a method of manufacturing a high strength galvanized steel sheet having a tensile strength TS of 540 MPa or more and having excellent stability of mechanical properties and formability (high ductility and high hole expansion property) and, in addition, excellent coating appearance.

SUMMARY

We thus provide:

(1) A method for manufacturing a high strength galvanized steel sheet having excellent stability of mechanical properties, formability, and coating appearance, characterized by including the steps of applying a first heating step to the steel sheet containing C: 0.04% or more and 0.13% or less, Si: 0.7% or more and 2.3% or less, Mn: 0.8% or more and 2.0% or less, P: 0.1% or less, S: 0.01% or less, Al: 0.1% or less, N: 0.008% or less, and the remainder composed of Fe and incidental impurities, on a percent by mass basis, in which, in the former part, heating is performed in an atmosphere containing $O_2$: 0.1 to 20 percent by volume and $H_2O$: 1 to 50 percent by volume such that the temperature thereof becomes within the range of 400° C. to 750° C. and, in the latter part, heating of the steel sheet is performed in an atmosphere containing $O_2$: 0.01 to less than 0.1 percent by volume and $H_2O$: 1 to 20 percent by volume such that the temperature of the steel sheet becomes within the range of 600° C. to 850° C., applying a second heating step to the resultant steel sheet, in which holding of the steel sheet is performed in an atmosphere containing $H_2$: 1 to 50 percent by volume and having a dew point of 0° C. or lower in a temperature range of 750° C. to 900° C. for 15 to 600 s, cooling to a temperature range of 450° C. to 550° C. is performed, and holding is performed in the temperature range of 450° C. to 550° C. for 10 to 200 s, and applying a galvanization treatment, wherein an obtained galvanized steel sheet includes 75% or more of ferrite phase, 1.0% or more of bainitic ferrite phase, and 1.0% or more and 10.0% or less of pearlite phase, on an area ratio basis, the area ratio of martensite phase is 1.0% or more and less than 5.0%, and the area ratio of martensite phase/(area ratio of bainitic ferrite phase+area ratio of pearlite phase) 0.6 is satisfied.

(2) The method for manufacturing a high strength galvanized steel sheet having excellent stability of mechanical properties, formability, and coating appearance, according to the above-described item (1), characterized in that the above-described steel sheet further contains at least one type of element selected from Cr: 1.0% or less, V: 0.5% or less, Mo: 0.5% or less, Ni: 1.0% or less, and Cu: 1.0% or less on a percent by mass basis.

(3) The method for manufacturing a high strength galvanized steel sheet having excellent stability of mechanical properties, formability, and coating appearance, according to the above-described item (1) or item (2), characterized in that the above-described steel sheet further contains at least one type of element selected from Ti: 0.1% or less, Nb: 0.1% or less, and B: 0.0050% or less on a percent by mass basis.

(4) The method for manufacturing a high strength galvanized steel sheet having excellent stability of mechanical properties, formability, and coating appearance, according to any one of the above-described items (1) to (3), characterized in that the above-described steel sheet further contains at least one type of element selected from Ca: 0.005% or less and REM: 0.005% or less on a percent by mass basis.

(5) The method for manufacturing a high strength galvanized steel sheet having excellent stability of mechanical properties, formability, and coating appearance, according to any one of the above-described items (1) to (4), characterized in that the former part of the above-described first heating step is performed with a direct fired furnace or a non-oxidizing furnace under the condition of the air ratio of 1 or more and 1.3 or less and the latter part of the above-described first heating step is performed with a direct fired furnace or a non-oxidizing furnace under the condition of the air ratio of 0.6 or more and less than 1.

(6) The method for manufacturing a high strength galvanized steel sheet having excellent stability of mechanical properties, formability, and coating appearance, according to any one of the above-described items (1) to (5), characterized in that, after the above-described galvanization treatment is applied, an alloying treatment of zinc coating is performed at a temperature of 500° C. to 600° C. under the condition satisfying the following formula:

$$0.45 \leq \exp[200/(400-T)] \times \ln(t) \leq 1.0$$

where

T: average holding temperature (° C.) at a temperature of 500° C. to 600° C., t: holding time (s) at a temperature of 500° C. to 600° C., and exp(X) and ln(X) represent an exponential function and natural logarithm, respectively, of X.

In this regard, every % indicating a component of a steel is on a percent by mass basis. Furthermore, "high strength galvanized steel sheet" refers to a galvanized steel sheet having a tensile strength TS of 540 MPa or more.

Moreover, regardless of whether an alloying treatment is performed or not, steel sheets in which a zinc coating is applied to a steel sheet by galvanization are generically called galvanized steel sheets. That is, the galvanized steel sheets include both galvanized steel sheets not subjected to an alloying treatment and galvannealed steel sheets subjected to an alloying treatment.

A high strength galvanized steel sheet, which has a tensile strength TS of 540 MPa or more, which has excellent formability and stability of mechanical properties because of high ductility and high hole expansion property and, furthermore, which has excellent coating appearance, is obtained. In the case where the high strength galvanized steel sheet is applied to, for example, an automobile structural member, enhancement of fuel economy due to weight reduction of a car body can be facilitated. Therefore, an industrial utility value is very large.

DETAILED DESCRIPTION

We found the following:

By specifying the Si content to be more than or equal to a predetermined amount by virtue of intentional addition of Si, an improvement of ductility due to an improvement of a work hardening property of ferrite, ensuring of strength due to solution hardening of ferrite, and an improvement of hole expansion property due to relaxation of hardness difference from a secondary phase become possible.

By making the most of bainitic ferrite and pearlite, the hardness difference between mild ferrite and hard martensite can be relaxed and the hole expansion property can be improved.

If much hard martensite is present in a final microstructure, a large hardness difference occurs at an interface between the mild ferrite phase and a different phase, so that the hole expansion property is degraded. Therefore, untransformed austenite, which is transformed to martensite finally, is converted to pearlite and, thereby, a microstructure including ferrite, bainitic ferrite, pearlite, a small amount of martensite is formed, so that the hole expansion property can be improved while high ductility is maintained. In addition, the area ratio of each of the above-described phases is controlled appropriately and, thereby, the stability of mechanical properties can be ensured.

Meanwhile, it has been known that the coating appearance is degraded if Si is contained. Usually, as for a galvanized steel sheet, a heat treatment is performed in a reducing atmosphere and, thereafter, a galvanization treatment is performed. Si added to the steel is an easy-to-be-oxidized element and, therefore, is selectively oxidized even in the commonly used reducing atmosphere to form Si oxide on the surface of the steel sheet. The resulting oxide reduces the wettability with molten zinc during a coating treatment and cause bare spots. Therefore, the wettability is reduced along with an increase in the Si concentration in the steel and bare spots occurs frequently.

To cope with such problems, the wettability with the molten zinc can be improved by heating the steel sheet in advance in an oxidizing atmosphere to form iron oxide on the surface and, thereafter, performing reduction annealing. On the other hand, iron oxide peeled from the steel sheet surface at the initial stage of the reduction annealing may adhere to a roll and cause a scale mark on the steel sheet surface. As a result of our efforts to find a solution to such an issue linked to peeling of iron oxide from the steel sheet surface, we found that the peeling of iron oxide was suppressed by heating the steel sheet in a slightly oxidizing atmosphere after iron oxide was formed to reduce the outermost surface of iron oxide.

Our methods and steel sheets will now be described below in detail.

(1) Initially, the component composition will be described.

(a) C: 0.04% or More and 0.13% or Less

Carbon is an austenite forming element and is an element indispensable for strengthening a steel. It is difficult to ensure predetermined strength if the C content is less than 0.04%. On the other hand, if the C content is more than 0.13%, a welded zone and a heat-affected zone are hardened significantly, and the mechanical characteristics of the welded zone are degraded, so that the spot weldability, the arc weldability, and the like are degraded. Therefore, the C content is 0.04% or more and 0.13% or less.

(b) Si: 0.7% or More and 2.3% or Less

Silicon is a ferrite forming element and is also an element effective in solution hardening. It is necessary that 0.7% or more of Si be contained to ensure good ductility due to an improvement in work hardening property of the ferrite phase. Furthermore, it is also necessary that 0.7% or more be contained to ensure a predetermined area ratio of bainitic ferrite phase and ensure good hole expansion property. However, if Si is excessively contained, degradation of surface quality due to an occurrence of red scale and the like and degradation of deposition and adhesion of the coating are caused. Therefore, the Si content is 0.7% or more and 2.3% or less, and preferably 1.2% or more and 1.8% or less.

(c) Mn: 0.8% or More and 2.0% or Less

Manganese is an element effective in strengthening a steel. Furthermore, Mn is an element to stabilize austenite and an element necessary to adjust the ratio of a secondary phase. For this purpose, it is necessary that 0.8% or more of Mn be contained. On the other hand, if the content is excessive and is more than 2.0%, the area ratio of martensite phase in the secondary phase increases and it becomes difficult to ensure the stability of mechanical properties. Moreover, an increase in cost is brought about because an alloy cost of Mn has increased in recent years. Therefore, the Mn content is 0.8% or more and 2.0% or less, and preferably 1.0% or more and 1.8% or less.

(d) P: 0.1% or Less

Phosphorus is an element effective in strengthening a steel. However, if the content is excessive and is more than 0.1%, embrittlement is caused by grain boundary segregation, and the impact resistance is degraded. Furthermore, if the content is more than 0.1%, an alloying rate is reduced significantly. Therefore, the P content is 0.1% or less.

(e) S: 0.01% or Less

Sulfur forms inclusions, e.g., MnS, to cause degradation in impact resistance and cracking along a metal flow of a welded zone. Therefore, the content thereof is minimized, although the S content is 0.01% or less from the viewpoint of production cost.

(f) al: 0.1% or Less

Coarse $Al_2O_3$ is generated and the quality of steel sheets is degraded if the Al content is more than 0.1%. Therefore, the Al content is 0.1% or less. Meanwhile, in the case where Al is added for deoxidation of a steel, it is preferable that the content is 0.01% or more because, if the content thereof is less than 0.01%, a large number of coarse oxides of Mn, Si, and the like are dispersed in the steel to degrade the quality. Therefore, the preferable range of the Al content is 0.01% to 0.1%.

(g) N: 0.008% or Less

Nitrogen is an element which degrades the aging resistance of a steel to a greatest extent and preferably is minimized. Degradation of the aging resistance becomes significant if the content thereof is more than 0.008%. Therefore, the N content is 0.008% or less.

The remainder is composed of Fe and incidental impurities. However, besides these elements, at least one type selected from the following elements can be added, as necessary.

(h) at Least One Type Selected from Cr: 1.0% or Less, V: 0.5% or Less, Mo: 0.5% or Less, Ni: 1.0% or Less, and Cu: 1.0% or Less Chromium, vanadium, and molybdenum have a function of improving the balance between strength and ductility and, therefore, can be added as necessary. However, if Cr, V, and Mo are added to exceed Cr: 1.0%, V: 0.5%, and Mo: 0.5%, respectively, the secondary phase ratio becomes too large, and concerns rise over a significant increase in strength and the like. Furthermore, an increase in cost is brought about. Therefore, in the case where these elements are added, the individual amounts thereof are Cr: 1.0% or less, V: 0.5% or less, and Mo: 0.5% or less. So that the above-described effects are effectively exerted, Cr: 0.05% or more, V: 0.005% or more, and Mo: 0.005% or more are preferable.

Nickel and copper are elements effective in strengthening a steel and can be added as necessary. Furthermore, there is a function of facilitating internal oxidation to improve adhesion of the coating. However, if both Ni and Cu, more than 1.0% each, are contained, formability of the steel sheet is degraded. Moreover, an increase in cost is brought about. Therefore, in the case where Ni and Cu are added, the content of each of them is 1.0% or less. In this regard, so that the above-described effects are effectively exerted, each of the contents of Ni and Cu is preferably 0.05% or more.

(i) at Least One Type Selected from Ti: 0.1% or Less, Nb: 0.1% or Less, and B: 0.0050% or Less Titanium and niobium are elements effective in precipitation hardening of steel and can be added as necessary. However, if each of the contents thereof is more than 0.1%, the formability and the shape fixability are degraded. Furthermore, an increase in cost is brought about. Therefore, in the case where Ti and Nb are added, the content of each of them is 0.1% or less. In this regard, so that the above-described effects are effectively exerted, each of the contents of Ti and Nb is preferably 0.01% or more.

Boron functions to suppress generation and growth of ferrite from austenite grain boundaries and, therefore, can be added as necessary. However, if 0.0050% is exceeded, formability is degraded. Furthermore, an increase in cost is brought about. Therefore, in the case where B is added, the content thereof is 0.0050% or less. In this regard, so that the above-described effects are effectively exerted, the content thereof is preferably 0.0003% or more.

(j) at Least One Type Selected from Ca: 0.005% or Less and REM: 0.005% or Less

Calcium and REM (Rare Earth Metal) are elements effective in spheroidizing the shape of a sulfide to improve an adverse influence of the sulfide on the hole expansion property. However, if the content is excessive, increases in inclusions and the like are caused and lead to surface and internal defects and the like. Therefore, in the case where Ca and REM are added, each of the contents thereof is 0.005% or less. In this regard, so that the above-described effects are effectively exerted, each of the content thereof is preferably 0.001% or more.

(2) Next, a steel microstructure will be described.

(a) Area Ratio of Ferrite Phase: 75% or More

To ensure good ductility, it is necessary that a ferrite phase be 75% or more on an area ratio basis.

(b) Area Ratio of Bainitic Ferrite Phase: 1.0% or More

It is necessary to reduce a hardness difference between the mild ferrite and the hard martensite to ensure good hole expansion property. Consequently, it is necessary that the area ratio of bainitic ferrite phase be 1.0% or more.

(c) Area Ratio of Pearlite Phase: 1.0% or More and Less than 10.0%

The area ratio of pearlite phase is specified to be 1.0% or more to ensure good hole expansion property. To ensure predetermined balance between the strength and the ductility, the area ratio of pearlite phase is 10.0% or less.

(d) Area Ratio of Martensite Phase: 1.0% or More and Less than 5.0%

The area ratio of martensite phase is specified to be 1.0% or more to ensure predetermined balance between the strength and the ductility. To ensure good stability of mechanical properties, it is necessary that the area ratio of martensite phase having a large influence on the tensile characteristics (TS, EL) is less than 5.0%.

(e) Area Ratio of Martensite Phase/(Area Ratio of Bainitic Ferrite Phase+Area Ratio of Pearlite phase)≤0.6

To ensure good stability of mechanical properties, it is necessary that, in the phase configuration of the secondary phase, the amount of martensite, which causes variations in mechanical properties, be reduced and the amounts of bainitic ferrite and pearlite milder than martensite be increased, i.e., the area ratio of martensite phase/(area ratio of bainitic ferrite phase+area ratio of pearlite phase)≤0.6 be satisfied.

Meanwhile, retained austenite, tempered martensite, and carbides, e.g., cementite, may be generated besides ferrite, bainitic ferrite, pearlite, and martensite. However, our purposes can be achieved insofar as the above-described area ratios of ferrite, bainitic ferrite, pearlite, and martensite phases are satisfied.

In this regard, the area ratios of ferrite, bainitic ferrite, pearlite, and martensite phases refer to proportions of the areas of the individual phases constituting an observation area.

Our high strength galvanized steel sheet includes the steel sheet having the above-described component composition and the above-described steel microstructure and serving as a substrate steel sheet and a coating film through galvanization or a coating film subjected to an alloying treatment after the galvanization on the substrate steel sheet.

(3) Next, Production Conditions Will be Described.

The high strength galvanized steel sheet is produced by subjecting a steel sheet obtained from a steel having the component composition conforming to the above-described component composition range to two steps of heating treatments described below and, thereafter, subjecting to a galvanization treatment or further subjecting to an alloying treatment after the galvanization treatment.

(a) Production of Steel Sheet

A steel having the above-described component composition is produced by melting, made into a slab through roughing slabbing or continuous casting, and made into a hot rolled steel sheet through hot rolling by a known method. In performing hot rolling, it is preferable that the slab be heated to 1,100° C. to 1,300° C., and hot rolled at a final finishing temperature of 850° C. or higher, and the resulting steel sheet be coiled at 400° C. to 650° C. In the case where the coiling temperature exceeds 650° C., carbides in the hot rolled steel sheet may become coarse and required strength may not be obtained in some cases because such coarse carbides are not dissolved completely during soaking in annealing. Subsequently, a pickling treatment is performed by a known method. The hot rolled steel sheet thus obtained may be used as the above-described steel sheet, or the hot rolled steel sheet after pickling is performed may be further cold-rolled and the resulting cold rolled steel sheet may be used as the above-described steel sheet. In performing the cold rolling, the condition thereof is not necessarily specifically limited, although it is preferable that the cold rolling is performed at the cold reduction ratio of 30% or more. This is because if the cold reduction ratio is low, in some cases, recrystallization of ferrite is not facilitated, unrecrystallized ferrite remains, and the ductility and the hole expansion property are degraded.

(b) Heating Treatment (i) First Heating Step

As for a first heating step, in the former part, the steel sheet is heated in an atmosphere containing $O_2$: 0.1 to 20 percent by volume and $H_2O$: 1 to 50 percent by volume such that the temperature thereof becomes 400° C. to 750° C. and, in the latter part, the steel sheet is heated in an atmosphere containing $O_2$: 0.01 to less than 0.1 percent by volume and $H_2O$: 1 to 20 percent by volume such that the temperature thereof becomes 600° C. to 850° C.

First Heating Step Former Part

The first heating step former part is performed to oxidize the steel sheet, and the $O_2$ is 0.1 percent by volume or more because an amount sufficient to induce oxidation is required. In this regard, $O_2$ is preferably 20 percent by volume or less, which is the same level as the air, for reason of economy. To facilitate oxidation, $H_2O$ is 1 percent by volume or more. In this regard, $H_2O$ is preferably 50 percent by volume or less in consideration of a humidification cost. In the step of the former part, if the temperature after the heating is lower than 400° C., oxidation is not induced easily. If the temperature is higher than 750° C., oxidation is induced excessively and iron oxide is peeled by a roll in a second heating step. Therefore, in the former part, heating is performed such that the steel sheet temperature becomes 400° C. or higher and 750° C. or lower.

First Heating Step Latter Part

The first heating step latter part is performed to reduce the steel sheet surface which has been oxidized once and suppress an occurrence of bruise. For that purpose, the heating in the latter part is performed under the condition in which the steel sheet surface can be reduced, but peeling of iron oxide does not occur, that is, the condition of low-temperature reduction heating in a low-oxygen concentration atmosphere to reduce the steel sheet surface, which has been oxidized once in the former part, to such an extent that peeling of iron oxide does not occur in the following second heating step. In this case, $O_2$ is less than 0.1 percent by volume because reduction cannot be induced when $O_2$ is 0.1 percent by volume or more. However, 0.01 percent by volume or more of $O_2$ is necessary. If a large amount of $H_2O$ is contained, the steel sheet is oxidized and, therefore, $H_2O$ is 20 percent by volume or less. However, 1 percent by volume or more of $H_2O$ is necessary. If the steel sheet temperature is lower than 600° C., reduction is not induced easily, and if the temperature is higher than 850° C., the heating cost increases. Therefore, in the latter part, heating is performed such that the steel sheet temperature is 600° C. or higher and 850° C. or lower.

In the case where the heating in the former part is performed with a direct fired furnace (DFF) or a non-oxidizing furnace (NOF), it is preferable that the heating be performed under the condition in which a C gas generated in a coke oven is used as a fuel gas and the air ratio is 1 or more and 1.3 or less. This is because if the air ratio is less than 1, oxidation of the steel sheet is not induced and if the air ratio is more than 1.3, pick up occurs by excessive oxidation. Meanwhile, in the case where the heating in the latter part is performed with a direct fired furnace (DFF) or a non-oxidizing furnace (NOF), it is preferable that the heating be performed under the condition in which a C gas generated in a coke oven is used as a fuel gas and the air ratio is 0.6 or more and less than 1. This is because if the air ratio is 1 or more, iron oxide on the steel sheet surface cannot be reduced and if the air ratio is less than 0.6, the combustion efficiency decreases.

(ii) Second Heating Step

The second heating step is performed successively to the first heating step and induces reduction and adjusts the steel sheet microstructure, wherein holding of the steel sheet is performed in an atmosphere containing $H_2$: 1 to 50 percent by volume and having a dew point of 0° C. or lower at a temperature of 750° C. to 900° C. for 15 to 600 s, cooling to a temperature of 450° C. to 550° C. is performed, and holding is performed at a temperature of 450° C. to 550° C. for 10 to 200 s.

Atmosphere Containing $H_2$: 1 to 50 Percent by Volume and Having Dew Point of 0° C. or Lower If $H_2$ is less than 1 percent by volume and the dew point is higher than 0° C., iron oxide generated in the first heating step is hardly reduced and, therefore, even if iron oxide sufficient to ensure wettability is generated in the first heating step, on the contrary, wettability is degraded. If $H_2$ is more than 50 percent by volume, an increase in cost is brought about. If the dew point is lower than −60° C., industrial implementation is difficult and, therefore, the dew point is preferably −60° C. or higher.

Holding in Temperature Range of 750° C. to 900° C. for 15 to 600 s

Annealing, which is holding the steel sheet at a temperature of 750° C. to 900° C., specifically in a single phase region of austenite or in a two-phase region of austenite and ferrite, for 15 to 600 s, is performed. In the case where the annealing temperature is lower than 750° C. or the holding time is less than 15 s, hard cementite in the steel sheet is not dissolved sufficiently so that the hole expansion property is degraded and, furthermore, a predetermined area ratio of martensite phase is not obtained, so that the ductility is degraded. On the other hand, if the annealing temperature is higher than 900° C., austenite grains grow significantly, it becomes difficult to ensure bainitic ferrite due to bainite transformation which occurs in the holding after cooling so that the hole expansion property is degraded. Moreover, the area ratio of martensite phase/(area ratio of bainitic ferrite phase+area ratio of pearlite phase) exceeds 0.6, so that good stability of mechanical properties is not obtained. In addition, if the holding time exceeds 600 s, austenite becomes coarse, it becomes difficult to ensure predetermined strength, and an increase in cost associated with large energy consumption may be brought about.

Holding in Temperature Range of 450° C. to 550° C. for 10 to 200 s

After the above-described annealing is performed, cooling to a temperature of 450° C. to 550° C. is performed, followed by holding at a temperature of 450° C. to 550° C. for 10 to 200 s. If the holding temperature is higher than 550° C. or the holding time becomes less than 10 s, bainite transformation is not facilitated, and the area ratio of bainitic ferrite phase becomes less than 1.0%, so that a predetermined hole expansion property is not obtained. Meanwhile, if the holding temperature becomes lower than 450° C. or the holding time exceeds 200 s, most of the secondary phase is converted to austenite and bainitic ferrite, which are generated through facilitation of bainite transformation and which contain large amounts of carbon in solid solution. Then a predetermined area ratio of pearlite phase of 1.0% or more is not obtained and, furthermore, the area ratio of hard martensite phase becomes 5.0% or more so that good hole expansion property and stability of mechanical properties are not obtained.

(c) Galvanization Treatment

After the above-described second heating step, the steel sheet is dipped into a coating bath at a usual bath temperature to be galvanized, and the amount of deposition of coating is adjusted through gas wiping or the like, followed by cooling, so that a galvanized steel sheet having a coating layer not subjected to alloying is obtained.

In the case where a galvanized steel sheet subjected to an alloying treatment is produced, after the galvanization treatment is performed, the alloying treatment of zinc coating is performed at a temperature of 500° C. to 600° C. under the condition satisfying the following formula:

$$0.45 \leq \exp[200/(400-T)] \times \ln(t) \leq 1.0$$

where
T: average holding temperature (° C.) at a temperature of 500° C. to 600° C.,
t: holding time (s) at a temperature of 500° C. to 600° C., and
exp(X) and ln(X) represent an exponential function and natural logarithm, respectively, of X.

If $\exp[200/(400-T)] \times \ln(t)$ is less than 0.45, much martensite is present in a steel microstructure after the alloying treatment, the above-described hard martensite adjoins mild ferrite to cause a large hardness difference between different phases so that the hole expansion property is degraded. Furthermore, the area ratio of martensite phase/(area ratio of bainitic ferrite phase+area ratio of pearlite phase) is more than 0.6 and, thereby, the stability of mechanical properties is impaired. Moreover, deposition property of the galvanization layer is degraded. If $\exp[200/(400-T)] \times \ln(t)$ exceeds 1.0, most of untransformed austenite is transformed to cementite or pearlite and, as a result, predetermined balance between the strength and the ductility is not ensured.

Meanwhile, at a temperature lower than 500° C., alloying of the coating layer is not facilitated, and it is difficult to obtain a galvannealed steel sheet. Also, at a temperature exceeding 600° C., most of the secondary phase is converted to pearlite so that a predetermined area ratio of martensite phase is not obtained and the balance between the strength and the ductility is degraded.

An alloying treatment is performed at a temperature of 500° C. to 600° C. such that $\exp[200/(400-T)] \times \ln(t)$ satisfies the above-described range and, thereby, a high strength galvanized steel sheet can be obtained without an occurrence of such problems.

A high strength galvanized steel sheet, which has a tensile strength TS of 540 MPa or more, which has excellent formability and stability of mechanical properties, and which also has excellent coating appearance, is thus obtained.

Figure 1:
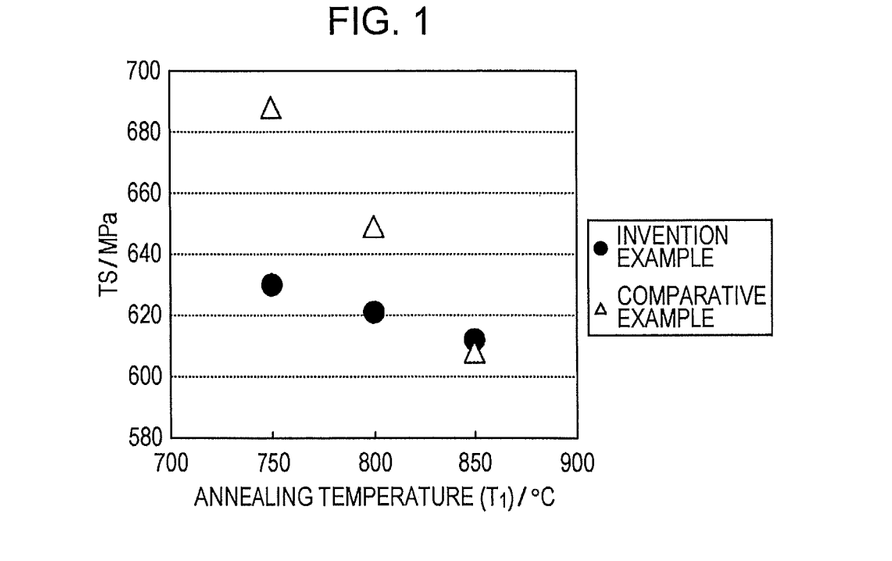
FIG. 1 is a diagram showing the relationship between the annealing temperature ($T_1$) and TS.
Figure 2:
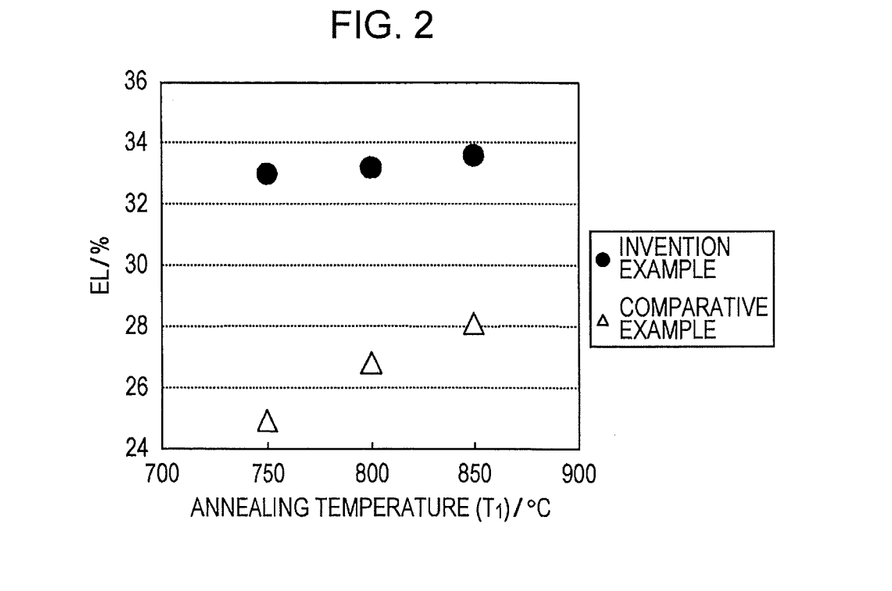
FIG. 2 is a diagram showing the relationship between the annealing temperature ($T_1$) and EL.
Figure 3:
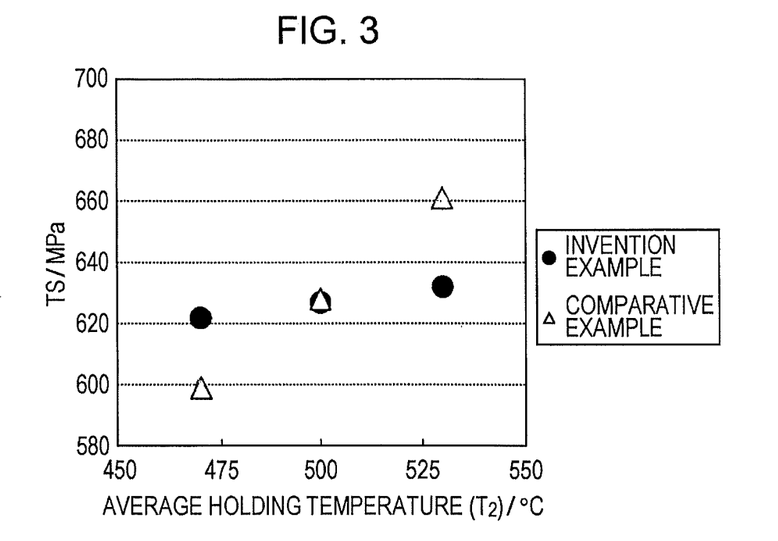
FIG. 3 is a diagram showing the relationship between the cooling average holding temperature ($T_2$) and TS.
Figure 4:
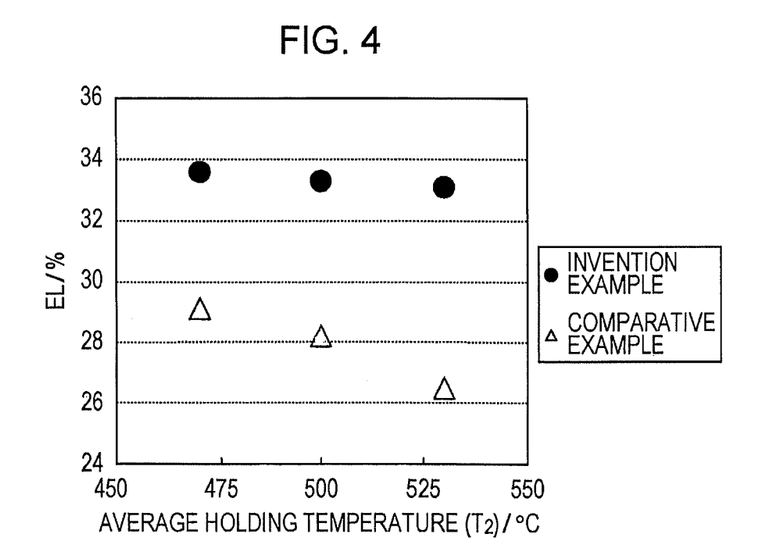
FIG. 4 is a diagram showing the relationship between the cooling average holding temperature ($T_2$) and EL.

FIG. 1 and FIG. 2 are diagrams showing the organized relationships between the annealing temperature ($T_1$) and TS and between the annealing temperature ($T_1$) and EL in the second heating step with respect to Nos. 15, 16, and 17 of Steel A, which are our examples, (Table 2 and Table 5) and Nos. 18, 19, and 20 of Steel H, which are comparative examples, (Table 2 and Table 5) in Examples described later. Also, FIG. 3 and FIG. 4 are diagrams showing the organized relationships between the average holding temperature ($T_2$) during cooling after annealing and TS and between the average holding temperature ($T_2$) and EL in the second heating step with respect to Nos. 21, 22, and 23 of Steel A, which are our examples, (Table 2 and Table 5) and Nos. 24, 25, and 26 of Steel H, which are comparative examples, (Table 2 and Table 5) in Examples described later.

As is clear from FIGS. 1 and 2, variations in TS and EL associated with changes in annealing temperature of Steel A of our example are small, whereas variations in TS and EL of Steel H of the comparative example are large. Also, as is clear from FIGS. 3 and 4, variations in TS and EL associated with changes in average holding temperature of Steel A of our example are small, whereas variations in TS and EL of Steel H of the comparative example are large.

As is clear from the above-described results, a high strength galvanized steel sheet having high stability of mechanical properties is obtained according to our methods.

By the way, in a series of heat treatments in our manufacturing method, the holding temperature is not necessarily constant insofar as the temperature is in the above-described range. Furthermore, even in the case where the cooling rate is changed during cooling, there is no problem insofar as the rate is in the specified range. Moreover, the steel sheet may be subjected to a heat treatment by any equipment insofar as only the heat history specified in our method is satisfied. In addition, it is also in the scope of our methods that our steel sheets are subjected to temper rolling after the heat treatment for the purpose of shape correction.

In this regard, typically, the steel sheet is usually produced from a steel through the individual steps of steel making, casting, hot rolling, and the like. However, for example, the steel sheet may be produced through thin wall casting or the like, where a part of or whole hot rolling step is omitted.

EXAMPLES

A steel having a component composition shown in Table 1, where the remainder was composed of Fe and incidental impurities, was produced by melting with a converter, and made into a slab by a continuous casting method. The resulting slab was heated to 1,200° C., then hot rolled to a sheet thickness of 3.2 mm at a finishing temperature of 870° C. to 920° C., and coiled at 520° C. Subsequently, the resulting hot rolled sheet was pickled to produce a hot rolled steel sheet. A part of the hot rolled steel sheet was served as a pickled hot rolled steel sheet, and the remainder was further subjected to cold rolling to produce a cold rolled steel sheet. Then, the hot rolled steel sheet after pickling and the cold rolled steel sheet obtained as described above were subjected to an annealing treatment, a galvanization treatment and, furthermore, an alloying treatment of the coating layer with a continuous galvanization line under the production condition shown in Tables 2 to 4 to obtain a galvanized steel sheet (galvanized steel with cold rolled steel sheet substrate: Nos. 1 to 90, galvanized steel with hot rolled steel sheet substrate: Nos. 91 and 92). The amount of deposition of coating was specified to be 30 to 50 g/m² on one surface basis. Galvanized steel sheets, which were not subjected to an alloying treatment after a galvanization treatment, were also produced partly.

TABLE 1

| Steel type | Chemical component (percent by mass) | | | | | | | | | | |
|---|---|---|---|---|---|---|---|---|---|---|---|
| | C | Si | Mn | Al | P | S | N | Ni | Cu | Cr | V |
| A | 0.085 | 1.48 | 1.41 | 0.029 | 0.016 | 0.0020 | 0.0029 | — | — | — | — |
| B | 0.094 | 1.49 | 1.40 | 0.031 | 0.017 | 0.0021 | 0.0030 | — | — | — | — |
| C | 0.077 | 1.51 | 1.39 | 0.030 | 0.015 | 0.0022 | 0.0031 | — | — | — | — |
| D | 0.084 | 1.55 | 1.40 | 0.031 | 0.017 | 0.0021 | 0.0030 | — | — | — | — |
| E | 0.086 | 1.45 | 1.39 | 0.030 | 0.015 | 0.0022 | 0.0031 | — | — | — | — |
| F | 0.084 | 1.50 | 1.49 | 0.031 | 0.017 | 0.0021 | 0.0030 | — | — | — | — |
| G | 0.086 | 1.50 | 1.30 | 0.030 | 0.015 | 0.0022 | 0.0031 | — | — | — | — |
| H | 0.084 | <u>0.24</u> | 1.81 | 0.035 | 0.026 | 0.0020 | 0.0036 | — | — | 0.15 | 0.061 |
| I | 0.094 | <u>0.25</u> | 1.80 | 0.035 | 0.026 | 0.0020 | 0.0036 | — | — | 0.16 | 0.062 |
| J | 0.076 | <u>0.25</u> | 1.79 | 0.035 | 0.026 | 0.0020 | 0.0036 | — | — | 0.16 | 0.062 |
| K | 0.086 | <u>0.29</u> | 1.80 | 0.035 | 0.026 | 0.0020 | 0.0036 | — | — | 0.14 | 0.060 |
| L | 0.085 | <u>0.20</u> | 1.80 | 0.035 | 0.026 | 0.0020 | 0.0036 | — | — | 0.16 | 0.059 |
| M | 0.085 | <u>0.23</u> | 1.91 | 0.035 | 0.026 | 0.0020 | 0.0036 | — | — | 0.15 | 0.059 |
| N | 0.085 | <u>0.23</u> | 1.72 | 0.035 | 0.026 | 0.0020 | 0.0036 | — | — | 0.15 | 0.058 |
| O | 0.104 | 1.37 | 1.22 | 0.031 | 0.012 | 0.0019 | 0.0036 | — | — | — | — |
| P | 0.055 | 1.53 | 1.68 | 0.032 | 0.021 | 0.0027 | 0.0039 | — | — | — | — |
| Q | 0.092 | 0.98 | 1.63 | 0.039 | 0.023 | 0.0028 | 0.0032 | — | — | — | — |
| R | 0.076 | 1.47 | 1.32 | 0.028 | 0.018 | 0.0019 | 0.0035 | — | — | 0.18 | — |
| S | 0.079 | 1.55 | 1.38 | 0.026 | 0.012 | 0.0018 | 0.0031 | — | — | — | 0.055 |
| T | 0.090 | 1.41 | 1.32 | 0.030 | 0.013 | 0.0030 | 0.0030 | — | — | — | — |
| U | 0.085 | 1.52 | 1.42 | 0.026 | 0.008 | 0.0025 | 0.0032 | — | — | — | — |
| V | 0.081 | 1.46 | 1.35 | 0.029 | 0.011 | 0.0027 | 0.0029 | — | — | — | — |
| W | 0.076 | 1.52 | 1.19 | 0.031 | 0.018 | 0.0023 | 0.0036 | 0.21 | 0.14 | — | — |
| X | 0.093 | 1.46 | 1.33 | 0.030 | 0.009 | 0.0030 | 0.0033 | — | — | — | — |
| Y | <u>0.151</u> | 1.42 | 1.50 | 0.039 | 0.022 | 0.0026 | 0.0034 | — | — | — | — |
| Z | 0.102 | <u>0.39</u> | 1.71 | 0.030 | 0.019 | 0.0028 | 0.0031 | — | — | — | — |
| AA | 0.056 | 1.22 | <u>2.39</u> | 0.028 | 0.016 | 0.0019 | 0.0033 | — | — | — | — |

| Steel type | Chemical component (percent by mass) | | | | | | Remarks |
|---|---|---|---|---|---|---|---|
| | Mo | Nb | Ti | B | Ca | REM | |
| A | — | — | — | — | — | — | Invention example |
| B | — | — | — | — | — | — | Invention example |
| C | — | — | — | — | — | — | Invention example |
| D | — | — | — | — | — | — | Invention example |
| E | — | — | — | — | — | — | Invention example |
| F | — | — | — | — | — | — | Invention example |
| G | — | — | — | — | — | — | Invention example |

TABLE 1-continued

| | | | | | | |
|---|---|---|---|---|---|---|
| H | — | — | — | — | — | Comparative example |
| I | — | — | — | — | — | Comparative example |
| J | — | — | — | — | — | Comparative example |
| K | — | — | — | — | — | Comparative example |
| L | — | — | — | — | — | Comparative example |
| M | — | — | — | — | — | Comparative example |
| N | — | — | — | — | — | Comparative example |
| O | — | — | — | — | — | Invention example |
| P | — | — | — | — | — | Invention example |
| Q | — | — | — | — | — | Invention example |
| R | — | — | — | — | — | Invention example |
| S | — | — | — | — | — | Invention example |
| T | 0.046 | — | — | — | — | Invention example |
| U | — | 0.021 | — | — | — | Invention example |
| V | — | — | 0.019 | 0.0020 | — | Invention example |
| W | — | — | — | — | — | Invention example |
| X | — | — | — | — | 0.0020 | 0.0010 | Invention example |
| Y | — | — | — | — | — | Comparative example |
| Z | — | — | — | — | — | Comparative example |
| AA | — | — | — | — | — | Comparative example |

Underlined portion: out of the scope of the present invention

TABLE 2

| | | First heating step former part | | | | | First heating step latter part | | | | | Second heating step | | |
|---|---|---|---|---|---|---|---|---|---|---|---|---|---|---|
| | | | | | Heating | | | | | Heating | | | | | |
| No. | Steel type | $O_2$ % | $H_2O$ % | Others | tempera- ture °C. | Air ratio | $O_2$ % | $H_2O$ % | Others | tempera- ture °C. | Air ratio | Furnace type | $H_2$ % | Dew point °C. | Others |
| 1 | A | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 2 | B | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 3 | C | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 4 | D | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 5 | E | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 6 | F | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 7 | G | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 8 | H | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 9 | I | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 10 | J | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 11 | K | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 12 | L | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 13 | M | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 14 | N | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 15 | A | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 16 | A | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 17 | A | 2 | 15 | $N_2, CO_2, CO, H_2$ | 680 | 1.15 | 0.01 | 5 | $N_2, CO_2, CO$ | 700 | 0.85 | DFF | 10 | −35 | $N_2, CO_2, CO$ |
| 18 | H | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 19 | H | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 20 | H | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 21 | A | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 22 | A | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |

TABLE 2-continued

| No. | Steel type | O₂ % | H₂O % | Others | Heating temperature °C | Air ratio | O₂ % | H₂O % | Others | Heating temperature °C | Air ratio | Furnace type | H₂ % | Dew point °C | Others |
|---|---|---|---|---|---|---|---|---|---|---|---|---|---|---|---|
| 23 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 24 | H | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 25 | H | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 26 | H | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 27 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 28 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 29 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 30 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |

| | Second heating step | | | | | | | |
|---|---|---|---|---|---|---|---|---|
| No. | Heating temperature $T_1$ °C | Annealing time s | Average holding temperature after cooling up to dipping into coating bath $T_2$ °C | Holding time after cooling up to dipping into coating bath s | Average holding temperature: T °C | Holding time: t s | exp(200/(400 − T)) × ln(t) | Remarks |
| 1 | 855 | 160 | 495 | 60 | 570 | 15 | 0.835 | Invention example |
| 2 | 855 | 160 | 495 | 60 | 570 | 15 | 0.835 | Invention example |
| 3 | 855 | 160 | 495 | 60 | 570 | 15 | 0.835 | Invention example |
| 4 | 855 | 160 | 495 | 60 | 570 | 15 | 0.835 | Invention example |
| 5 | 855 | 160 | 495 | 60 | 570 | 15 | 0.835 | Invention example |
| 6 | 855 | 160 | 495 | 60 | 570 | 15 | 0.835 | Invention example |
| 7 | 855 | 160 | 495 | 60 | 570 | 15 | 0.835 | Invention example |
| 8 | 830 | 160 | 495 | 60 | 520 | 15 | 0.511 | Comparative example |
| 9 | 830 | 160 | 495 | 60 | 520 | 15 | 0.511 | Comparative example |
| 10 | 830 | 160 | 495 | 60 | 520 | 15 | 0.511 | Comparative example |
| 11 | 830 | 160 | 495 | 60 | 520 | 15 | 0.511 | Comparative example |
| 12 | 830 | 160 | 495 | 60 | 520 | 15 | 0.511 | Comparative example |
| 13 | 830 | 160 | 495 | 60 | 520 | 15 | 0.511 | Comparative example |
| 14 | 830 | 160 | 495 | 60 | 520 | 15 | 0.511 | Comparative example |
| 15 | 850 | 160 | 495 | 60 | 570 | 15 | 0.835 | Invention example |
| 16 | 800 | 160 | 495 | 60 | 570 | 15 | 0.835 | Invention example |
| 17 | 750 | 160 | 495 | 60 | 570 | 15 | 0.835 | Invention example |
| 18 | 850 | 160 | 495 | 60 | 520 | 15 | 0.511 | Comparative example |
| 19 | 800 | 160 | 495 | 60 | 520 | 15 | 0.511 | Comparative example |
| 20 | 750 | 160 | 495 | 60 | 520 | 15 | 0.511 | Comparative example |
| 21 | 850 | 160 | 530 | 60 | 570 | 15 | 0.835 | Invention example |
| 22 | 850 | 160 | 500 | 60 | 570 | 15 | 0.835 | Invention example |
| 23 | 850 | 160 | 470 | 60 | 570 | 15 | 0.835 | Invention example |
| 24 | 830 | 160 | 530 | 60 | 520 | 15 | 0.511 | Comparative example |
| 25 | 830 | 160 | 500 | 60 | 520 | 15 | 0.511 | Comparative example |
| 26 | 830 | 160 | 470 | 60 | 520 | 15 | 0.511 | Comparative example |
| 27 | 860 | 120 | 500 | 40 | 580 | 10 | 0.758 | Invention example |
| 28 | 780 | 120 | 500 | 40 | 580 | 10 | 0.758 | Invention example |
| 29 | 840 | 280 | 530 | 100 | 555 | 25 | 0.886 | Invention example |
| 30 | 840 | 280 | 470 | 100 | 555 | 25 | 0.886 | Invention example |

Underlined portion: out of the scope of the present invention

TABLE 3

| | | First heating step former part | | | | | First heating step latter part | | | | | | Second heating step | | |
|---|---|---|---|---|---|---|---|---|---|---|---|---|---|---|---|---|
| No. | Steel type | O₂ % | H₂O % | Others | Heating temperature °C | Air ratio | O₂ % | H₂O % | Others | Heating temperature °C | Air ratio | Furnace type | H₂ % | Dew point °C | Others |
| 31 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 32 | A | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |
| 33 | O | 2 | 15 | $N_2$, $CO_2$, CO, $H_2$ | 700 | 1.15 | 0.01 | 5 | $N_2$, $CO_2$, CO | 750 | 0.85 | DFF | 10 | −35 | $N_2$, $CO_2$, CO |

TABLE 3-continued

| No. | | | | | | | | | | | | | | | | |
|---|---|---|---|---|---|---|---|---|---|---|---|---|---|---|---|---|
| 34 | O | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 35 | O | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 36 | A | 2 | 15 | N₂, CO₂, CO, H₂ | 750 | 1.15 | 0.01 | 5 | N₂, CO₂, CO | 800 | 0.85 | DFF | 10 | −35 | N₂, CO₂, CO |
| 37 | A | 2 | 15 | N₂, CO₂, CO, H₂ | 680 | 1.15 | 0.01 | 5 | N₂, CO₂, CO | 700 | 0.85 | DFF | 10 | −35 | N₂, CO₂, CO |
| 38 | A | 0.5 | 15 | N₂, CO₂, CO, H₂ | 700 | 1.10 | 0.01 | 5 | N₂, CO₂, CO | 720 | 0.85 | DFF | 10 | −35 | N₂, CO₂, CO |
| 39 | A | 0.5 | 15 | N₂, CO₂, CO, H₂ | 680 | 1.10 | 0.01 | 5 | N₂, CO₂, CO | 700 | 0.85 | DFF | 10 | −35 | N₂, CO₂, CO |
| 40 | A | 0.5 | 15 | N₂, CO₂, CO, H₂ | 600 | 1.10 | 0.01 | 5 | N₂, CO₂, CO | 650 | 0.85 | DFF | 10 | −35 | N₂, CO₂, CO |
| 41 | A | 0.1 | 15 | N₂, CO₂, CO, H₂ | 680 | 1.05 | 0.01 | 5 | N₂, CO₂, CO | 750 | 0.85 | DFF | 10 | −35 | N₂, CO₂, CO |
| 42 | A | 8 | 15 | N₂, CO₂, CO, H₂ | 680 | 1.25 | 0.01 | 5 | N₂, CO₂, CO | 750 | 0.85 | DFF | 10 | −35 | N₂, CO₂, CO |
| 43 | A | 0.1 | 15 | N₂, CO₂, CO, H₂ | 550 | 1.05 | 0.01 | 5 | N₂, CO₂, CO | 630 | 0.85 | DFF | 10 | −35 | N₂, CO₂, CO |
| 44 | A | 0.1 | 15 | N₂, CO₂, CO, H₂ | 480 | 1.05 | 0.01 | 5 | N₂, CO₂, CO | 610 | 0.85 | DFF | 10 | −35 | N₂, CO₂, CO |
| 45 | A | 2 | 15 | N₂, CO₂, CO, H₂ | 750 | 1.15 | 0.01 | 5 | N₂, CO₂, CO | __880__ | 0.85 | DFF | 10 | −35 | N₂, CO₂, CO |
| 46 | A | 2 | 15 | N₂, CO₂, CO, H₂ | 450 | 1.15 | 0.01 | 5 | N₂, CO₂, CO | __470__ | 0.85 | DFF | 10 | −35 | N₂, CO₂, CO |
| 47 | A | 2 | 15 | N₂, CO₂, CO, H₂ | 700 | 1.15 | __2__ | 15 | N₂, CO₂, CO | 750 | __1.15__ | DFF | 10 | −35 | N₂, CO₂, CO |
| 48 | A | 2 | 15 | N₂, CO₂, CO, H₂ | 700 | __0.85__ | 0.01 | 5 | N₂, CO₂, CO | 750 | 0.85 | DFF | 10 | −35 | N₂, CO₂, CO |
| 49 | A | 10 | 15 | N₂, CO₂, CO, H₂ | 660 | __1.35__ | 0.01 | 5 | N₂, CO₂, CO | 680 | 0.85 | DFF | 10 | −35 | N₂, CO₂, CO |
| 50 | A | 2 | 15 | N₂, CO₂, CO, H₂ | 660 | 1.15 | 0.01 | 5 | N₂, CO₂, CO | 680 | 0.85 | DFF | 10 | −35 | N₂, CO₂, CO |
| 51 | O | 2 | 15 | N₂, CO₂, CO, H₂ | 570 | 1.15 | 0.01 | 5 | N₂, CO₂, CO | 600 | 0.85 | DFF | 10 | −35 | N₂, CO₂, CO |
| 52 | O | 2 | 15 | N₂, CO₂, CO, H₂ | __800__ | 1.15 | 0.01 | 5 | N₂, CO₂, CO | 850 | 0.85 | DFF | 10 | −35 | N₂, CO₂, CO |
| 53 | P | 2 | 15 | N₂, CO₂, CO, H₂ | 750 | 1.15 | 0.01 | 5 | N₂, CO₂, CO | 800 | 0.85 | DFF | 10 | −35 | N₂, CO₂, CO |
| 54 | P | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 55 | P | 2 | 15 | N₂, CO₂, CO, H₂ | 740 | 1.15 | 0.01 | 5 | N₂, CO₂, CO | 780 | 0.85 | DFF | 10 | −35 | N₂, CO₂, CO |
| 56 | P | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 57 | P | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 58 | P | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |
| 59 | Q | 0.5 | 15 | N₂, CO₂, CO, H₂ | 650 | 1.10 | 0.01 | 5 | N₂, CO₂, CO | 700 | 0.85 | DFF | 10 | −35 | N₂, CO₂, CO |
| 60 | Q | 2 | 15 | N₂, CO₂, CO, H₂ | 700 | 1.15 | 0.01 | 5 | N₂, CO₂, CO | 750 | 0.85 | DFF | 10 | −35 | N₂, CO₂, CO |

| | Second heating step | | | | | | | |
|---|---|---|---|---|---|---|---|---|
| No. | Heating temperature $T_1$ °C. | Annealing time s | Average holding temperature after cooling up to dipping into coating bath $T_2$ °C. | Holding time after cooling up to dipping into coating bath s | Average holding temperature: T °C. | Holding time: t s | $\exp(200/(400-T)) \times \ln(t)$ | Remarks |
| 31 | 840 | 180 | 480 | 120 | — | — | — | Invention example |
| 32 | 780 | 180 | 480 | 120 | — | — | — | Invention example |
| 33 | 850 | 165 | 520 | 60 | 565 | 15 | 0.806 | Invention example |
| 34 | 850 | 165 | 470 | 60 | 565 | 15 | 0.806 | Invention example |
| 35 | 800 | 160 | 495 | 50 | 545 | 15 | 0.682 | Comparative example |
| 36 | 855 | 160 | 495 | 60 | 570 | 15 | 0.835 | Invention example |
| 37 | 855 | 160 | 495 | 60 | 570 | 15 | 0.835 | Invention example |
| 38 | 750 | 160 | 495 | 60 | 520 | 15 | 0.511 | Invention example |
| 39 | 750 | 160 | 495 | 60 | 520 | 15 | 0.511 | Invention example |
| 40 | 750 | 160 | 495 | 60 | 520 | 15 | 0.511 | Invention example |
| 41 | 750 | 160 | 495 | 60 | 520 | 15 | 0.511 | Invention example |
| 42 | 750 | 160 | 495 | 60 | 520 | 15 | 0.511 | Invention example |
| 43 | 750 | 280 | 530 | 100 | 555 | 25 | 0.886 | Invention example |
| 44 | 750 | 280 | 530 | 100 | 555 | 25 | 0.886 | Invention example |

TABLE 3-continued

|  |  |  |  |  |  |  |  |  |
|---|---|---|---|---|---|---|---|---|
| 45 | 900 | 160 | 495 | 60 | 570 | 15 | 0.835 | Comparative example |
| 46 | 750 | 160 | 530 | 100 | 555 | 25 | 0.886 | Comparative example |
| 47 | 855 | 160 | 495 | 60 | 570 | 15 | 0.835 | Comparative example |
| 48 | 855 | 160 | 495 | 60 | 570 | 15 | 0.835 | Comparative example |
| 49 | 855 | 160 | 495 | 60 | 570 | 15 | 0.835 | Comparative example |
| 50 | <u>700</u> | 160 | 495 | 60 | 570 | 15 | 0.835 | Comparative example |
| 51 | <u>650</u> | 180 | 500 | 60 | 555 | 15 | 0.745 | Comparative example |
| 52 | <u>935</u> | 230 | 485 | 65 | 570 | 15 | 0.835 | Comparative example |
| 53 | 860 | 180 | 490 | 55 | 575 | 12 | 0.792 | Invention example |
| 54 | 780 | 180 | 490 | 55 | 575 | 12 | 0.792 | Invention example |
| 55 | 830 | <u>850</u> | 505 | 55 | 580 | 12 | 0.818 | Comparative example |
| 56 | 840 | <u>5</u> | 495 | 45 | 570 | 12 | 0.766 | Comparative example |
| 57 | 860 | 160 | <u>600</u> | 45 | 570 | 12 | 0.766 | Comparative example |
| 58 | 810 | 170 | <u>130</u> | 60 | 560 | 12 | 0.712 | Comparative example |
| 59 | 845 | 190 | 520 | 70 | 565 | 18 | 0.860 | Invention example |
| 60 | 830 | 200 | 480 | <u>4</u> | 555 | 18 | 0.795 | Comparative example |

Underlined portion: out of the scope of the present invention

TABLE 4

| No. | Steel type | First heating step former part | | | | | First heating step latter part | | | | | Second heating step | | | |
|---|---|---|---|---|---|---|---|---|---|---|---|---|---|---|---|
| | | $O_2$ % | $H_2O$ % | Others | Heating temperature °C. | Air ratio | $O_2$ % | $H_2O$ % | Others | Heating temperature °C. | Air ratio | Furnace type | $H_2$ % | Dew point °C. | Others |
| 61 | Q | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 62 | Q | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 63 | Q | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 64 | Q | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 65 | Q | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 66 | R | 0.5 | 15 | $N_2, CO_2, CO, H_2$ | 650 | 1.10 | 0.01 | 5 | $N_2, CO_2, CO$ | 700 | 0.85 | NOF | 10 | −35 | $N_2, CO_2, CO$ |
| 67 | R | 2 | 15 | $N_2, CO_2, CO, H_2$ | 640 | 1.15 | 0.01 | 5 | $N_2, CO_2, CO$ | 680 | 0.85 | DFF | 10 | −35 | $N_2, CO_2, CO$ |
| 68 | R | 2 | 15 | $N_2, CO_2, CO, H_2$ | 500 | 1.15 | 0.01 | 5 | $N_2, CO_2, CO$ | 620 | 0.85 | DFF | 10 | −35 | $N_2, CO_2, CO$ |
| 69 | S | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 70 | T | 2 | 15 | $N_2, CO_2, CO, H_2$ | 700 | 1.15 | 0.01 | 5 | $N_2, CO_2, CO$ | 730 | 0.85 | DFF | 10 | −35 | $N_2, CO_2, CO$ |
| 71 | U | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 72 | U | 2 | 15 | $N_2, CO_2, CO, H_2$ | 700 | 1.15 | 0.01 | 5 | $N_2, CO_2, CO$ | 720 | 0.85 | DFF | 10 | −35 | $N_2, CO_2, CO$ |
| 73 | U | 2 | 15 | $N_2, CO_2, CO, H_2$ | 650 | 1.15 | 0.01 | 5 | $N_2, CO_2, CO$ | 680 | 0.85 | DFF | 10 | −35 | $N_2, CO_2, CO$ |
| 74 | V | 2 | 15 | $N_2, CO_2, CO, H_2$ | 600 | 1.15 | 0.01 | 5 | $N_2, CO_2, CO$ | 750 | 0.85 | DFF | 10 | −35 | $N_2, CO_2, CO$ |
| 75 | W | 2 | 15 | $N_2, CO_2, CO, H_2$ | 720 | 1.15 | 0.01 | 5 | $N_2, CO_2, CO$ | 750 | 0.85 | NOF | 10 | −35 | $N_2, CO_2, CO$ |
| 76 | X | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 77 | X | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 78 | X | 2 | 15 | $N_2, CO_2, CO, H_2$ | 680 | 1.15 | 0.01 | 5 | $N_2, CO_2, CO$ | 700 | 0.85 | DFF | 10 | −35 | $N_2, CO_2, CO$ |
| 79 | Y | 2 | 15 | $N_2, CO_2, CO, H_2$ | 700 | 1.15 | 0.01 | 5 | $N_2, CO_2, CO$ | 820 | 0.85 | DFF | 10 | −35 | $N_2, CO_2, CO$ |
| 80 | Y | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 81 | Y | 2 | 15 | $N_2, CO_2, CO, H_2$ | 600 | 1.15 | 0.01 | 5 | $N_2, CO_2, CO$ | 680 | 0.85 | DFF | 10 | −35 | $N_2, CO_2, CO$ |
| 82 | Z | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |
| 83 | Z | 2 | 15 | $N_2, CO_2, CO, H_2$ | 750 | 1.15 | 0.01 | 5 | $N_2, CO_2, CO$ | 780 | 0.85 | DFF | 10 | −35 | $N_2, CO_2, CO$ |
| 84 | Z | 2 | 15 | $N_2, CO_2, CO, H_2$ | 700 | 1.15 | 0.01 | 5 | $N_2, CO_2, CO$ | 750 | 0.85 | DFF | 10 | −35 | $N_2, CO_2, CO$ |

TABLE 4-continued

| | | | | | | | | | | | | | | | | |
|---|---|---|---|---|---|---|---|---|---|---|---|---|---|---|---|---|
| 85 | AA | 0.5 | 15 | N$_2$, CO$_2$, CO, H$_2$ | 680 | 1.10 | 0.01 | 5 | N$_2$, CO$_2$, CO | 750 | 0.85 | DFF | 10 | −35 | N$_2$, CO$_2$, CO |
| 86 | AA | 2 | 15 | N$_2$, CO$_2$, CO, H$_2$ | 700 | 1.15 | 0.01 | 5 | N$_2$, CO$_2$, CO | 750 | 0.85 | DFF | 10 | −35 | N$_2$, CO$_2$, CO |
| 87 | AA | 2 | 15 | N$_2$, CO$_2$, CO, H$_2$ | 600 | 1.15 | 0.01 | 5 | N$_2$, CO$_2$, CO | 680 | 0.85 | DFF | 10 | −35 | N$_2$, CO$_2$, CO |
| 88 | A | 0.1 | 15 | N$_2$, CO$_2$, CO, H$_2$ | 650 | 1.05 | 0.01 | 5 | N$_2$, CO$_2$, CO | 700 | 0.85 | DFF | 10 | −35 | N$_2$, CO$_2$, CO |
| 89 | A | 0.1 | 15 | N$_2$, CO$_2$, CO, H$_2$ | 650 | 1.05 | 0.01 | 5 | N$_2$, CO$_2$, CO | 700 | 0.85 | NOF | 10 | −35 | N$_2$, CO$_2$, CO |
| 90 | A | 0.1 | 15 | N$_2$, CO$_2$, CO, H$_2$ | 520 | 1.05 | 0.01 | 5 | N$_2$, CO$_2$, CO | 600 | 0.85 | DFF | 10 | −35 | N$_2$, CO$_2$, CO |
| 91 | A | 0.1 | 15 | N$_2$, CO$_2$, CO, H$_2$ | 540 | 1.05 | 0.01 | 5 | N$_2$, CO$_2$, CO | 600 | 0.85 | NOF | 10 | −35 | N$_2$, CO$_2$, CO |
| 92 | A | 0.1 | 15 | N$_2$, CO$_2$, CO, H$_2$ | 520 | 1.05 | 0.01 | 5 | N$_2$, CO$_2$, CO | 600 | 0.85 | DFF | 10 | −35 | N$_2$, CO$_2$, CO |

| | Second heating step | | | | | | |
|---|---|---|---|---|---|---|---|
| No. | Heating temperature T$_1$ °C. | Annealing time s | Average holding temperature after cooling up to dipping into coating bath T$^2$ °C. | Holding time after cooling up to dipping into coating bath s | Average holding temperature: T °C. | Holding time: t s | exp(200/(400 − T)) × ln(t) | Remarks |
| 61 | 845 | 180 | 510 | <u>410</u> | 560 | 18 | 0.828 | Comparative example |
| 62 | 840 | 200 | 510 | 55 | 570 | 40 | <u>1.138</u> | Comparative example |
| 63 | 845 | 170 | 520 | 60 | 510 | 6 | <u>0.291</u> | Comparative example |
| 64 | 810 | 190 | 490 | 70 | <u>660</u> | 18 | <u>1.339</u> | Comparative example |
| 65 | 820 | 210 | 485 | 65 | <u>470</u> | 18 | <u>0.166</u> | Comparative example |
| 66 | 860 | 230 | 495 | 90 | 555 | 22 | 0.851 | Invention example |
| 67 | 820 | 230 | 495 | 90 | 555 | 22 | 0.851 | Invention example |
| 68 | 790 | 220 | 495 | 85 | 555 | 22 | 0.851 | Invention example |
| 69 | 840 | 200 | 495 | 75 | 560 | 20 | 0.858 | Invention example |
| 70 | 840 | 100 | 500 | 45 | 575 | 11 | 0.765 | Invention example |
| 71 | 840 | 190 | 520 | 65 | 555 | 18 | 0.795 | Invention example |
| 72 | 810 | 190 | 520 | 70 | 555 | 18 | 0.795 | Invention example |
| 73 | 780 | 200 | 520 | 65 | 555 | 18 | 0.795 | Invention example |
| 74 | 825 | 260 | 510 | 110 | 550 | 26 | 0.859 | Invention example |
| 75 | 840 | 110 | 540 | 40 | 580 | 9 | 0.723 | Invention example |
| 76 | 850 | 170 | 495 | 60 | 570 | 14 | 0.814 | Invention example |
| 77 | 820 | 180 | 495 | 60 | 570 | 14 | 0.814 | Invention example |
| 78 | 790 | 180 | 495 | 60 | 570 | 14 | 0.814 | Invention example |
| 79 | 870 | 160 | 490 | 55 | 570 | 15 | 0.835 | Comparative example |
| 80 | 800 | 160 | 490 | 55 | 570 | 15 | 0.835 | Comparative example |
| 81 | 750 | 160 | 490 | 55 | 570 | 15 | 0.835 | Comparative example |
| 82 | 860 | 180 | 540 | 60 | 560 | 15 | 0.776 | Comparative example |
| 83 | 860 | 180 | 500 | 60 | 560 | 15 | 0.776 | Comparative example |
| 84 | 860 | 180 | 470 | 60 | 560 | 15 | 0.776 | Comparative example |
| 85 | 850 | 210 | 500 | 45 | 575 | 12 | 0.792 | Comparative example |
| 86 | 800 | 210 | 500 | 45 | 575 | 12 | 0.792 | Comparative example |
| 87 | 750 | 210 | 500 | 45 | 575 | 12 | 0.792 | Comparative example |
| 88 | 850 | 160 | 495 | 60 | 555 | 25 | 0.886 | Invention example |
| 89 | 800 | 160 | 495 | 60 | 555 | 25 | 0.886 | Invention example |
| 90 | 750 | 160 | 495 | 60 | 555 | 25 | 0.886 | Invention example |
| 91 | 850 | 160 | 495 | 60 | 555 | 25 | 0.886 | Invention example |
| 92 | 850 | 160 | 495 | 60 | 555 | 25 | 0.886 | Invention example |

Underlined portion: out of the scope of the present invention

The area ratios of ferrite, bainitic ferrite, pearlite, and martensite phases of the resulting galvanized steel sheet were determined by polishing a sheet thickness cross-section parallel to a rolling direction of the steel sheet, performing etching with 3% nital, and observing 10 visual fields with a SEM (scanning electron microscope) at a magnification of 2,000 times through the use of Image-Pro of Media Cybernetics, Inc. At that time, it was difficult to distinguish martensite and retained austenite. Therefore, the resulting galvanized steel sheet was subjected to a tempering treatment at 200° C. for 2 hours. Thereafter, the microstructure of a sheet thickness cross-section parallel to the rolling direction of the steel sheet was observed by the above-described method, and the aria ratio of tempered martensite phase determined by the above-described method was taken as the aria ratio of martensite phase.

Meanwhile, the volume ratio of retained austenite phase was determined on the basis of diffracted X-ray intensity of a face at one-quarter sheet thickness, where the steel sheet was grounded up to the one-quarter face in the sheet thickness direction. The Co—Kα line was used as the incident X-ray, the intensity ratios were determined with respect to all combinations of integrated intensities of peaks of {111}, {200}, {220}, and {311} planes of retained austenite phase and {110], {200}, and {211} planes of ferrite phase, and the average value of them was taken as the volume ratio of retained austenite phase.

Meanwhile, a tensile test was performed on the basis of JIS Z 2241 by using JIS No. 5 test piece, where a sample was taken such that a tensile direction became in the direction orthogonal to the rolling direction of the steel sheet, the TS (tensile strength) and the EL (total elongation) were measured, and the case of TS×EL≥19,000 MPa·% was evaluated as good ductility.

As for the stability of mechanical properties, (A) amounts of variations in TS and EL were examined with respect to steel sheets, where only the annealing temperatures $T_1$ were different and the conditions other than the annealing temperature $T_1$ were the same, and the amounts of variations (ΔTS and ΔEL) relative to 20° C. of change in the annealing temperature were determined from the resulting amounts of variations in TS and EL, in addition, (B) amounts of variations in TS and EL were examined with respect to steel sheets, where only the average holding temperatures $T_2$ after the cooling up to the dipping into a coating bath were different and the conditions other than the average holding temperatures $T_2$ after the cooling up to the dipping into a coating bath were the same, and the amounts of variations (ΔTS and ΔEL) relative to 20° C. of change in the average holding temperature after the cooling up to the dipping into a coating bath were determined from the resulting amounts of variations in TS and EL, and the evaluation was performed on the basis of each of the amounts of variations in TS (ΔTS) and the amounts of variations in EL (ΔEL) relative to the 20° C. of temperature change.

In addition, the hole expansion property (stretch flangeability) of the galvanized steel sheet obtained as described above was measured. The hole expansion property (stretch flangeability) was measured on the basis of the Japan Iron and Steel Federation Standard JFST1001. Each of the resulting steel sheets was cut into 100 mm×100 mm, and a hole having a diameter of 10 mm was punched with a clearance of 12%±1% when the sheet thickness was 2.0 mm or more and with a clearance of 12%±2% when the sheet thickness was less than 2.0 mm. Thereafter, a 60° cone punch was pushed into the hole while being held with a blank holder pressure of 9 ton by using a dice having an inside diameter of 75 mm, a hole diameter at the limit of occurrence of cracking was measured, a critical hole expansion ratio λ (%) was determined from the following formula, and the stretch flangeability was evaluated on the basis of the value of the resulting critical hole expansion ratio, and the case of λ≥70(%) was evaluated as good:

Critical hole expansion ratio $\lambda(\%) = \{(D_f - D_0)/D_0\} \times 100$ where $D_f$ represents a hole diameter (mm) when cracking occurred and $D_0$ represents an initial hole diameter (mm).

Meanwhile, the surface appearance was examined by a method described below.

Presence or absence of appearance defects, e.g., non-coating and bruise, was visually determined. The case where there was no appearance defect was evaluated as good (◯), the case where there were a few appearance defects, but most part were good was evaluated as good for the most part (Δ), and the case where there were appearance defects was evaluated as poor (x).

The results obtained as described above are shown in Tables 5 to 7.

TABLE 5

| No. | Steel type | Sheet thickness (mm) | Area ratio of F (%) | Area ratio of M (%) | Area ratio of BF (%) | Area ratio of P (%) | Volume ratio of RA (%) | M/(BF + P) | TS (MPa) | EL (%) | λ (%) |
|---|---|---|---|---|---|---|---|---|---|---|---|
| 1 | A | 1.4 | 87.6 | 2.2 | 3.6 | 4.4 | 1.2 | 0.28 | 626 | 32.9 | 102 |
| 2 | B | 1.4 | 84.1 | 3.5 | 4.2 | 5.1 | 2.2 | 0.38 | 645 | 32.4 | 89 |
| 3 | C | 1.4 | 88.9 | 1.7 | 3.2 | 4.1 | 0.8 | 0.23 | 611 | 33.2 | 111 |
| 4 | D | 1.4 | 88.8 | 1.8 | 4.1 | 3.2 | 1.2 | 0.25 | 632 | 33.2 | 98 |
| 5 | E | 1.4 | 86.2 | 3.0 | 3.6 | 4.8 | 0.9 | 0.36 | 623 | 33.1 | 104 |
| 6 | F | 1.4 | 85.7 | 3.8 | 3.6 | 3.2 | 2.2 | 0.56 | 645 | 32.4 | 88 |
| 7 | G | 1.4 | 88.2 | 1.5 | 4.0 | 4.9 | 0.7 | 0.17 | 609 | 33.4 | 110 |
| 8 | H | 1.4 | 83.9 | <u>13.2</u> | <u>0.8</u> | <u>0.7</u> | 0.7 | <u>8.80</u> | 624 | 27.6 | <u>53</u> |
| 9 | I | 1.4 | 82.5 | <u>14.8</u> | <u>0.5</u> | <u>0.4</u> | 0.8 | <u>16.4</u> | 689 | 25.2 | <u>44</u> |
| 10 | J | 1.4 | 86.8 | <u>10.7</u> | <u>0.7</u> | <u>0.3</u> | 0.7 | <u>10.7</u> | 589 | 29.5 | <u>60</u> |
| 11 | K | 1.4 | 84.5 | <u>13.0</u> | <u>0.8</u> | <u>0.7</u> | 0.5 | <u>8.67</u> | 630 | 27.8 | <u>49</u> |
| 12 | L | 1.4 | 83.4 | <u>14.7</u> | <u>0.6</u> | <u>0.4</u> | 0.5 | <u>14.70</u> | 618 | 27.8 | <u>52</u> |
| 13 | M | 1.4 | 81.9 | <u>15.2</u> | <u>0.9</u> | <u>0.4</u> | 1.1 | <u>11.69</u> | 691 | 26.0 | <u>45</u> |
| 14 | N | 1.4 | 84.4 | <u>12.4</u> | <u>0.9</u> | <u>0.6</u> | 0.6 | <u>8.27</u> | 601 | 28.6 | <u>55</u> |
| 15 | A | 1.4 | 87.6 | 2.4 | 3.6 | 5.1 | 0.9 | 0.28 | 612 | 33.6 | 110 |
| 16 | A | 1.4 | 87.4 | 2.3 | 3.7 | 5.0 | 1.1 | 0.26 | 621 | 33.2 | 105 |
| 17 | A | 1.4 | 87.5 | 2.2 | 3.6 | 4.8 | 1.3 | 0.26 | 630 | 33.0 | 103 |
| 18 | H | 1.4 | 84.9 | <u>12.2</u> | <u>0.8</u> | <u>0.8</u> | 0.5 | <u>7.63</u> | 608 | 28.1 | <u>58</u> |
| 19 | H | 1.4 | 83.8 | <u>13.2</u> | <u>0.7</u> | <u>0.8</u> | 0.6 | <u>8.80</u> | 649 | 26.8 | <u>50</u> |
| 20 | H | 1.4 | 82.8 | <u>14.1</u> | <u>0.6</u> | <u>0.6</u> | 0.7 | <u>11.75</u> | 688 | 24.9 | <u>42</u> |
| 21 | A | 1.4 | 87.6 | 2.4 | 3.6 | 4.7 | 1.2 | 0.29 | 632 | 33.1 | 99 |
| 22 | A | 1.4 | 87.9 | 2.1 | 3.8 | 4.8 | 1.0 | 0.24 | 627 | 33.3 | 103 |
| 23 | A | 1.4 | 87.4 | 2.0 | 4.1 | 4.7 | 1.3 | 0.23 | 622 | 33.6 | 112 |
| 24 | H | 1.4 | 83.1 | <u>13.9</u> | <u>0.7</u> | <u>0.7</u> | 0.7 | <u>9.93</u> | 661 | 26.5 | <u>48</u> |
| 25 | H | 1.4 | 84.1 | <u>13.2</u> | <u>0.8</u> | <u>0.5</u> | 0.9 | <u>10.15</u> | 628 | 28.2 | <u>54</u> |
| 26 | H | 1.4 | 84.8 | <u>12.3</u> | <u>0.8</u> | <u>0.6</u> | 1.0 | <u>8.79</u> | 599 | 29.1 | <u>61</u> |
| 27 | A | 0.8 | 85.6 | 3.8 | 4.9 | 2.7 | 2.1 | 0.50 | 648 | 31.5 | 89 |
| 28 | A | 0.8 | 84.5 | 4.2 | 5.2 | 2.6 | 2.5 | 0.54 | 659 | 30.8 | 86 |
| 29 | A | 2.3 | 86.1 | 2.1 | 4.8 | 5.8 | 0.5 | 0.20 | 606 | 35.2 | 111 |
| 30 | A | 2.3 | 85.9 | 1.8 | 5.4 | 6.0 | 0.4 | 0.16 | 600 | 35.8 | 123 |

| No. | TS × EL (MPa · %) | ΔT₁/Δ20° C. ΔTS | ΔT₁/Δ20° C. ΔEL | ΔT₂/Δ20° C. ΔTS | ΔT₂/Δ20° C. ΔEL | Surface appearance | Remarks |
|---|---|---|---|---|---|---|---|
| 1 | 20595 | — | — | — | — | ◯ | Invention example |
| 2 | 20898 | — | — | — | — | ◯ | Invention example |
| 3 | 20285 | — | — | — | — | ◯ | Invention example |

TABLE 5-continued

| | | | | | | | |
|---|---|---|---|---|---|---|---|
| 4 | 20982 | — | — | — | — | o | Invention example |
| 5 | 20621 | — | — | — | — | o | Invention example |
| 6 | 20898 | — | — | — | — | o | Invention example |
| 7 | 20341 | — | — | — | — | o | Invention example |
| 8 | 17222 | — | — | — | — | o | Comparative example |
| 9 | 17363 | — | — | — | — | o | Comparative example |
| 10 | 17376 | — | — | — | — | o | Comparative example |
| 11 | 17514 | — | — | — | — | o | Comparative example |
| 12 | 17180 | — | — | — | — | o | Comparative example |
| 13 | 17966 | — | — | — | — | o | Comparative example |
| 14 | 17189 | — | — | — | — | o | Comparative example |
| 15 | 20563 | 3.6 | 0.12 | — | — | o | Invention example |
| 16 | 20617 | | | — | — | o | Invention example |
| 17 | 20790 | | | — | — | o | Invention example |
| 18 | 17085 | 16.0 | 0.64 | — | — | o | Comparative example |
| 19 | 17393 | | | — | — | o | Comparative example |
| 20 | 17131 | | | — | — | o | Comparative example |
| 21 | 20919 | — | — | 3.3 | 0.16 | o | Invention example |
| 22 | 20879 | — | — | | | o | Invention example |
| 23 | 20899 | — | — | | | o | Invention example |
| 24 | 17517 | — | — | 20.6 | 0.86 | o | Comparative example |
| 25 | 17710 | — | — | | | o | Comparative example |
| 26 | 17431 | — | — | | | o | Comparative example |
| 27 | 20412 | 3.6 | 0.26 | — | — | o | Invention example |
| 28 | 20297 | | | — | — | o | Invention example |
| 29 | 21331 | — | — | 2.0 | 0.20 | o | Invention example |
| 30 | 21480 | — | — | | | o | Invention example |

Underlined portion: out of the scope of the present invention
F: ferrite, M: martensite, BF: bainitic ferrite, P: pearlite, RA: retained austenite
M/(BF + P): Area ratio of M/(Area ratio of BF + Area ratio of P)

TABLE 6

| No. | Steel type | Sheet thickness (mm) | Area ratio of F (%) | Area ratio of M (%) | Area ratio of BF (%) | Area ratio of P (%) | Volume ratio of RA (%) | M/(BF + P) | TS (MPa) | EL (%) | λ (%) |
|---|---|---|---|---|---|---|---|---|---|---|---|
| 31 | A | 1.4 | 83.8 | 4.2 | 6.4 | 1.8 | 3.1 | 0.51 | 654 | 34.1 | 87 |
| 32 | A | 1.4 | 84.2 | 4.4 | 6.5 | 1.7 | 2.8 | 0.54 | 661 | 34.2 | 84 |
| 33 | O | 1.4 | 84.9 | 3.5 | 5.4 | 4.9 | 0.8 | 0.34 | 648 | 32.4 | 92 |
| 34 | O | 1.4 | 83.9 | 3.7 | 5.8 | 5.1 | 1.1 | 0.34 | 640 | 32.8 | 97 |
| 35 | O | 1.4 | 85.1 | 6.8 | 2.2 | 3.2 | 1.8 | 1.26 | 628 | 30.6 | 67 |
| 36 | A | 1.4 | 87.8 | 2.1 | 3.8 | 4.1 | 1.4 | 0.27 | 628 | 33.2 | 96 |
| 37 | A | 1.4 | 87.6 | 2.4 | 3.9 | 4.2 | 1.3 | 0.30 | 624 | 32.8 | 101 |
| 38 | A | 1.4 | 88.4 | 3.4 | 2.9 | 3.6 | 1.0 | 0.52 | 620 | 31.8 | 79 |
| 39 | A | 1.4 | 88.9 | 3.2 | 2.9 | 3.4 | 0.9 | 0.51 | 611 | 32.4 | 80 |
| 40 | A | 1.4 | 88.2 | 3.6 | 3.0 | 3.8 | 0.7 | 0.53 | 615 | 32.6 | 76 |
| 41 | A | 1.4 | 88.9 | 3.0 | 2.4 | 3.6 | 1.4 | 0.50 | 618 | 32.3 | 75 |
| 42 | A | 1.4 | 88.4 | 3.5 | 2.8 | 3.6 | 1.0 | 0.55 | 612 | 32.8 | 78 |
| 43 | A | 2.3 | 87.1 | 2.5 | 4.2 | 5.1 | 0.7 | 0.27 | 608 | 35.6 | 121 |
| 44 | A | 2.3 | 86.9 | 2.3 | 5.0 | 5.2 | 0.6 | 0.23 | 605 | 36.0 | 109 |
| 45 | A | 1.4 | 87.6 | 2.3 | 4.2 | 3.8 | 1.9 | 0.29 | 609 | 32.8 | 102 |
| 46 | A | 2.3 | 87.6 | 2.2 | 4.1 | 5.2 | 0.6 | 0.24 | 608 | 33.6 | 82 |
| 47 | A | 1.4 | 88.2 | 2.4 | 3.6 | 3.6 | 1.6 | 0.33 | 619 | 32.4 | 88 |
| 48 | A | 1.4 | 87.6 | 2.8 | 3.8 | 3.8 | 1.5 | 0.37 | 621 | 32.8 | 96 |
| 49 | A | 1.4 | 87.9 | 2.9 | 3.9 | 3.9 | 1.3 | 0.37 | 617 | 32.6 | 92 |
| 50 | A | 1.4 | 84.8 | 0.3 | 2.8 | 3.4 | 0.5 | 0.05 | 601 | 28.9 | 62 |
| 51 | O | 1.4 | 84.6 | 0.2 | 2.9 | 3.2 | 0.8 | 0.03 | 620 | 29.7 | 64 |
| 52 | O | 1.4 | 88.9 | 4.7 | 0.8 | 3.7 | 0.3 | 1.04 | 615 | 30.1 | 65 |
| 53 | P | 1.2 | 87.8 | 2.7 | 4.1 | 3.8 | 0.7 | 0.34 | 618 | 32.8 | 101 |
| 54 | P | 1.2 | 85.7 | 2.8 | 4.5 | 3.7 | 0.8 | 0.34 | 623 | 32.6 | 104 |
| 55 | P | 1.2 | 86.2 | 0.4 | 3.2 | 6.2 | 0.1 | 0.04 | 562 | 31.6 | 90 |
| 56 | P | 1.2 | 85.2 | 0.3 | 2.1 | 2.8 | 0.5 | 0.06 | 603 | 31.2 | 62 |
| 57 | P | 1.2 | 86.1 | 3.5 | 0.6 | 7.6 | 0.5 | 0.43 | 621 | 27.8 | 89 |
| 58 | P | 1.2 | 85.1 | 8.1 | 1.2 | 3.2 | 1.5 | 1.84 | 645 | 26.4 | 65 |
| 59 | Q | 1.6 | 87.8 | 2.1 | 4.1 | 4.4 | 0.6 | 0.25 | 620 | 32.8 | 100 |
| 60 | Q | 1.6 | 86.2 | 4.8 | 0.2 | 7.2 | 0.2 | 0.65 | 640 | 26.9 | 69 |

| No. | TS × EL (MPa · %) | ΔT$_1$/Δ20° C. | | ΔT$_2$/Δ20° C. | | Surface appearance | Remarks |
|---|---|---|---|---|---|---|---|
| | | ΔTS | ΔEL | ΔTS | ΔEL | | |
| 31 | 22301 | 2.3 | 0.03 | — | — | o | Invention example |
| 32 | 22606 | | | — | — | o | Invention example |
| 33 | 20995 | — | — | 2.6 | 0.13 | o | Invention example |
| 34 | 20992 | — | — | | | o | Invention example |

TABLE 6-continued

| | | | | | | | |
|---|---|---|---|---|---|---|---|
| 35 | 19217 | — | — | — | — | ○ | Comparative example |
| 36 | 20850 | — | — | — | — | ○ | Invention example |
| 37 | 20467 | — | — | — | — | Δ | Invention example |
| 38 | 19716 | — | — | — | — | ○ | Invention example |
| 39 | 19796 | — | — | — | — | ○ | Invention example |
| 40 | 20049 | — | — | — | — | ○ | Invention example |
| 41 | 19961 | — | — | — | — | ○ | Invention example |
| 42 | 20074 | — | — | — | — | ○ | Invention example |
| 43 | 21645 | — | — | — | — | ○ | Invention example |
| 44 | 21780 | — | — | — | — | Δ | Invention example |
| 45 | 19975 | — | — | — | — | x | Comparative example |
| 46 | 20429 | — | — | — | — | x | Comparative example |
| 47 | 20056 | — | — | — | — | x | Comparative example |
| 48 | 20369 | — | — | — | — | x | Comparative example |
| 49 | 20114 | — | — | — | — | x | Comparative example |
| 50 | <u>17369</u> | — | — | — | — | x | Comparative example |
| 51 | <u>18414</u> | — | — | — | — | x | Comparative example |
| 52 | <u>18512</u> | — | — | — | — | x | Comparative example |
| 53 | 20270 | 1.3 | 0.05 | — | — | ○ | Invention example |
| 54 | 20310 | — | — | — | — | ○ | Invention example |
| 55 | <u>17759</u> | — | — | — | — | x | Comparative example |
| 56 | <u>18814</u> | — | — | — | — | x | Comparative example |
| 57 | <u>17264</u> | — | — | — | — | x | Comparative example |
| 58 | <u>17028</u> | — | — | — | — | x | Comparative example |
| 59 | 20336 | — | — | — | — | Δ | Invention example |
| 60 | <u>17216</u> | — | — | — | — | x | Comparative example |

Underlined portion: out of the scope of the present invention
F: ferrite, M: martensite, BF: bainitic ferrite, P: pearlite, RA: retained austenite
M/(BF + P): Area ratio of M/(Area ratio of BF + Area ratio of P)

TABLE 7

| No. | Steel type | Sheet thickness (mm) | Area ratio of F (%) | Area ratio of M (%) | Area ratio of BF (%) | Area ratio of P (%) | Volume ratio of RA (%) | M/(BF + P) | TS (MPa) | EL (%) | λ (%) |
|---|---|---|---|---|---|---|---|---|---|---|---|
| 61 | Q | 1.6 | 80.1 | <u>0.6</u> | 6.4 | <u>10.3</u> | 0.1 | 0.04 | <u>538</u> | 30.1 | 85 |
| 62 | Q | 1.6 | 84.1 | <u>0.5</u> | 4.5 | <u>10.4</u> | 0.3 | 0.03 | 592 | 31.2 | 85 |
| 63 | Q | 1.6 | 79.1 | <u>6.3</u> | 8.4 | 1.6 | 3.8 | <u>0.63</u> | 654 | 31.2 | <u>50</u> |
| 64 | Q | 1.6 | 84.2 | <u>0.3</u> | 4.4 | <u>10.5</u> | 0.2 | 0.02 | 595 | 31.6 | 87 |
| 65 | Q | 1.6 | 79.1 | <u>6.5</u> | 8.4 | 1.4 | 4.1 | <u>0.66</u> | 650 | 31.2 | <u>55</u> |
| 66 | R | 2.0 | 87.8 | 1.6 | 3.6 | 5.2 | 0.8 | 0.18 | 615 | 34.0 | 112 |
| 67 | R | 2.0 | 87.6 | 1.7 | 3.7 | 5.0 | 1.2 | 0.20 | 617 | 33.8 | 108 |
| 68 | R | 2.0 | 87.5 | 1.8 | 3.8 | 5.1 | 1.3 | 0.20 | 620 | 33.2 | 102 |
| 69 | S | 1.8 | 87.6 | 2.0 | 3.2 | 5.0 | 1.0 | 0.24 | 626 | 33.1 | 108 |
| 70 | T | 1.0 | 86.4 | 3.8 | 4.3 | 3.2 | 1.9 | 0.51 | 631 | 32.4 | 95 |
| 71 | U | 1.6 | 87.2 | 2.4 | 3.6 | 4.8 | 1.4 | 0.29 | 628 | 32.9 | 102 |
| 72 | U | 1.6 | 87.3 | 2.5 | 3.6 | 4.8 | 1.2 | 0.30 | 631 | 32.6 | 100 |
| 73 | U | 1.6 | 87.5 | 2.6 | 3.5 | 4.9 | 1.3 | 0.31 | 635 | 32.2 | 99 |
| 74 | V | 2.3 | 86.8 | 1.6 | 4.0 | 6.2 | 0.6 | 0.16 | 613 | 35.1 | 121 |
| 75 | W | 0.8 | 85.2 | 4.2 | 5.2 | 2.8 | 2.3 | 0.53 | 640 | 32.4 | 92 |
| 76 | X | 1.4 | 87.4 | 2.1 | 3.5 | 4.9 | 1.1 | 0.25 | 625 | 32.9 | 99 |
| 77 | X | 1.4 | 87.2 | 2.2 | 3.6 | 5.0 | 1.2 | 0.26 | 627 | 32.6 | 100 |
| 78 | X | 1.4 | 87.0 | 2.4 | 3.7 | 5.2 | 1.3 | 0.27 | 630 | 32.4 | 95 |
| 79 | Y | 1.4 | 81.4 | <u>14.3</u> | <u>0.6</u> | <u>0.2</u> | 2.2 | <u>17.88</u> | 596 | 31.6 | <u>60</u> |
| 80 | Y | 1.4 | 83.1 | <u>12.8</u> | <u>0.7</u> | <u>0.3</u> | 2.5 | <u>12.80</u> | 652 | 29.1 | <u>45</u> |
| 81 | Y | 1.4 | 85.2 | <u>10.7</u> | <u>0.8</u> | <u>0.5</u> | 2.6 | <u>8.23</u> | 698 | 26.4 | <u>38</u> |
| 82 | Z | 1.4 | 84.4 | <u>12.1</u> | <u>0.4</u> | <u>0.4</u> | 0.7 | <u>15.13</u> | 645 | 29.0 | <u>41</u> |
| 83 | Z | 1.4 | 86.4 | <u>10.3</u> | <u>0.6</u> | <u>0.6</u> | 0.9 | <u>8.58</u> | 621 | 29.8 | <u>50</u> |
| 84 | Z | 1.4 | 87.6 | <u>8.9</u> | <u>0.8</u> | <u>0.3</u> | 1.2 | <u>8.09</u> | 596 | 30.1 | <u>57</u> |
| 85 | AA | 1.2 | 88.2 | <u>6.2</u> | <u>0.8</u> | <u>0.7</u> | 2.6 | <u>4.13</u> | 609 | 30.5 | <u>62</u> |
| 86 | AA | 1.2 | 85.4 | <u>8.2</u> | <u>0.8</u> | <u>0.6</u> | 3.4 | <u>5.86</u> | 641 | 29.4 | <u>48</u> |
| 87 | AA | 1.2 | 82.1 | <u>10.4</u> | <u>0.7</u> | <u>0.6</u> | 3.8 | <u>8.00</u> | 684 | 27.9 | <u>40</u> |
| 88 | A | 2.3 | 87.8 | 2.0 | 3.2 | 5.6 | 1.2 | 0.23 | 610 | 34.8 | 120 |
| 89 | A | 2.3 | 87.9 | 2.2 | 3.0 | 5.2 | 1.2 | 0.27 | 606 | 35.0 | 115 |
| 90 | A | 2.3 | 87.1 | 1.9 | 3.6 | 5.9 | 1.2 | 0.20 | 603 | 34.9 | 114 |
| 91 | A | 2.6 | 86.9 | 3.4 | 3.5 | 4.2 | 1.7 | 0.44 | 619 | 36.1 | 118 |
| 92 | A | 3.2 | 87.1 | 3.2 | 3.1 | 4.5 | 1.9 | 0.42 | 612 | 36.8 | 123 |

| No. | TS × EL (MPa · %) | ΔT$_1$/Δ20° C. ΔTS | ΔT$_1$/Δ20° C. ΔEL | ΔT$_2$/Δ20° C. ΔTS | ΔT$_2$/Δ20° C. ΔEL | Surface appearance | Remarks |
|---|---|---|---|---|---|---|---|
| 61 | <u>16194</u> | — | — | — | — | x | Comparative example |
| 62 | <u>18470</u> | — | — | — | — | x | Comparative example |
| 63 | 20405 | — | — | — | — | x | Comparative example |

TABLE 7-continued

| | | | | | | |
|---|---|---|---|---|---|---|
| 64 | 18802 | — | — | — | — | x | Comparative example |
| 65 | 20280 | — | — | — | — | x | Comparative example |
| 66 | 20910 | 1.4 | 0.22 | — | — | Δ | Invention example |
| 67 | 20855 | | | — | — | ○ | Invention example |
| 68 | 20584 | | | — | — | ○ | Invention example |
| 69 | 20721 | — | — | — | — | ○ | Invention example |
| 70 | 20444 | — | — | — | — | ○ | Invention example |
| 71 | 20661 | 2.3 | 0.23 | — | — | ○ | Invention example |
| 72 | 20571 | | | — | — | ○ | Invention example |
| 73 | 20447 | | | — | — | ○ | Invention example |
| 74 | 21516 | — | — | — | — | ○ | Invention example |
| 75 | 20736 | — | — | — | — | ○ | Invention example |
| 76 | 20563 | 1.6 | 0.16 | — | — | ○ | Invention example |
| 77 | 20440 | | | — | — | ○ | Invention example |
| 78 | 20412 | | | — | — | ○ | Invention example |
| 79 | 18834 | 17.3 | 0.86 | — | — | x | Comparative example |
| 80 | 18973 | | | — | — | x | Comparative example |
| 81 | 18427 | | | — | — | x | Comparative example |
| 82 | 18705 | — | — | 14.0 | 0.31 | x | Comparative example |
| 83 | 18506 | — | — | | | x | Comparative example |
| 84 | 17940 | — | — | | | x | Comparative example |
| 85 | 18575 | 15.0 | 0.52 | — | — | x | Comparative example |
| 86 | 18845 | | | — | — | x | Comparative example |
| 87 | 19084 | | | — | — | x | Comparative example |
| 88 | 21228 | 1.4 | 0.04 | — | — | ○ | Invention example |
| 89 | 21210 | | | — | — | ○ | Invention example |
| 90 | 21045 | | | — | — | Δ | Invention example |
| 91 | 22346 | — | — | — | — | ○ | Invention example |
| 92 | 22522 | — | — | — | — | ○ | Invention example |

Underlined portion: out of the scope of the present invention
F: ferrite, M: martensite, BF: bainitic ferrite, P: pearlite, RA: retained austenite
M/(BF + P): Area ratio of M/(Area ratio of BF + Area ratio of P)

Since every one of our galvanized steel sheets has TS of 540 MPa or more and λ of 70% or more to exhibit excellent hole expansion property and, furthermore, satisfies TS×EL≥19,000 MPa·% so that the balance between the strength and the ductility is high, it is clear that a high strength galvanized steel sheet having excellent formability is obtained by our methods of manufacturing high strength galvanized steel sheets. Moreover, the values of ΔTS and ΔEL are small and, therefore, it is clear that a high strength galvanized steel sheet having excellent stability of mechanical properties is obtained. On the other hand, in the comparative examples, at least one of the ductility and the hole expansion property is poor, or the stability of mechanical properties is not favorable.

Meanwhile, it is clear that our high strength galvanized steel sheets do not include non-coating and has excellent surface appearance, whereas in the comparative example, non-coating occurs and the surface appearance is poor.

INDUSTRIAL APPLICABILITY

The high strength galvanized steel sheets have a tensile strength TS of 540 MPa or more, exhibit high ductility and high hole expansion property, and further have excellent stability of mechanical properties. In the case where the high strength galvanized steel sheets are applied to, for example, an automobile structural member, enhancement of fuel economy due to weight reduction of a car body can be facilitated. Therefore, an industrial utility value is very large.

The invention claimed is:
1. A method of manufacturing a high strength galvanized steel sheet having excellent stability of mechanical properties, formability, and coating appearance, comprising:
applying a first heating step to a steel sheet containing C: 0.04% or more and 0.13% or less, Si: 0.7% or more and 2.3% or less, Mn: 0.8% or more and 2.0% or less, P: 0.1% or less, S: 0.01% or less, Al: 0.1% or less, N: 0.008% or less, and the remainder composed of Fe and incidental impurities, on a percent by mass basis, in which, in a former part, heating is performed in an atmosphere containing $O_2$: 0.1 to 20 percent by volume and $H_2O$: 1 to 50 percent by volume at a temperature of 400° C. to 750° C. and, in a latter part, heating is performed in an atmosphere containing $O_2$: 0.01 to less than 0.1 percent by volume and $H_2O$: 1 to 20 percent by volume at a temperature of 600° C. to 850° C.;
applying a second heating step to the resultant steel sheet, in which holding is performed in an atmosphere containing $H_2$: 1 to 50 percent by volume and having a dew point of 0° C. or lower at a temperature of 750° C. to 900° C. for 15 to 600 s, cooling to a temperature of 450° C. to 550° C. is performed, and holding is performed at a temperature of 450° C. to 550° C. for 10 to 200 s; and
applying a galvanization treatment,
wherein the galvanized steel sheet includes 75% or more of ferrite phase, 1.0% or more of bainitic ferrite phase, and 1.0% or more and 10.0% or less of pearlite phase, on an area ratio basis, the area ratio of martensite phase is 1.0% or more and less than 5.0%, and the area ratio of the martensite phase/(area ratio of bainitic ferrite phase+ area ratio of pearlite phase)<0.6 is satisfied.

2. The method according to claim 1, wherein the steel sheet further contains at least one type of element selected from Cr: 1.0% or less, V: 0.5% or less, Mo: 0.5% or less, Ni: 1.0% or less, and Cu: 1.0% or less on a percent by mass basis.

3. The method according to claim 1, wherein the steel sheet further contains at least one type of element selected from Ti: 0.1% or less, Nb: 0.1% or less, and B: 0.0050% or less on a percent by mass basis.

4. The method according to claim 1, wherein the steel sheet further contains at least one type of element selected from Ca: 0.005% or less and REM: 0.005% or less on a percent by mass basis.

5. The method according to claim 1, wherein the former part of the first heating step is performed with a direct fired furnace or a non-oxidizing furnace under the condition of an air ratio of 1 or more and 1.3 or less and the latter part of the first heating step is performed with a direct fired furnace or a non-oxidizing furnace under the condition of an air ratio of 0.6 or more and less than 1.

6. The method according to claim 1, wherein, after the galvanization treatment is applied, an alloying treatment of zinc coating is performed at a temperature of 500° C. to 600° C. under conditions satisfying Formula (1):

$$0.45 \leq \exp[200/(400-T)] \times \ln(t) \leq 1.0 \quad (1)$$

where
- T: average holding temperature (° C.) at a temperature range of 500° C. to 600° C.,
- t: holding time (s) at a temperature of 500° C. to 600° C., and exp(X) and ln(X) represent an exponential function and natural logarithm, respectively, of X.

7. The method according to claim 2, wherein the steel sheet further contains at least one type of element selected from Ti: 0.1% or less, Nb: 0.1% or less, and B: 0.0050% or less on a percent by mass basis.

8. The method according to claim 2, wherein the steel sheet further contains at least one type of element selected from Ca: 0.005% or less and REM: 0.005% or less on a percent by mass basis.

9. The method according to claim 3, wherein the steel sheet further contains at least one type of element selected from Ca: 0.005% or less and REM: 0.005% or less on a percent by mass basis.

10. The method according to claim 2, wherein the former part of the first heating step is performed with a direct fired furnace or a non-oxidizing furnace under the condition of an air ratio of 1 or more and 1.3 or less and the latter part of the first heating step is performed with a direct fired furnace or a non-oxidizing furnace under the condition of an air ratio of 0.6 or more and less than 1.

11. The method according to claim 3, wherein the former part of the first heating step is performed with a direct fired furnace or a non-oxidizing furnace under the condition of an air ratio of 1 or more and 1.3 or less and the latter part of the first heating step is performed with a direct fired furnace or a non-oxidizing furnace under the condition of an air ratio of 0.6 or more and less than 1.

12. The method according to claim 4, wherein the former part of the first heating step is performed with a direct fired furnace or a non-oxidizing furnace under the condition of an air ratio of 1 or more and 1.3 or less and the latter part of the first heating step is performed with a direct fired furnace or a non-oxidizing furnace under the condition of an air ratio of 0.6 or more and less than 1.

* * * * *